(12) United States Patent
Frazier

(10) Patent No.: US 6,499,199 B2
(45) Date of Patent: Dec. 31, 2002

(54) BUNDLING DEVICE FOR A LENGTH OF LINE TYPE MATERIAL

(76) Inventor: Mark Frazier, 3342 Morning Brook, San Antonio, TX (US) 78247

( * ) Notice: Subject to any disclaimer, the term of this patent is extended or adjusted under 35 U.S.C. 154(b) by 0 days.

(21) Appl. No.: 09/861,749

(22) Filed: May 20, 2001

(65) Prior Publication Data

US 2002/0043592 A1 Apr. 18, 2002

Related U.S. Application Data

(60) Provisional application No. 60/218,567, filed on Jul. 16, 2000.

(51) Int. Cl.[7] ............................................. B65D 63/00
(52) U.S. Cl. ..................... 24/306; 248/205.3; 248/74.3; 24/30.5 R
(58) Field of Search ............................ 24/10 PB, 16 R, 24/306, 17 AP, 30.5 R, 30.5 P; 248/74.3, 205.3, 205.2

(56) References Cited

U.S. PATENT DOCUMENTS

| | | |
|---|---|---|
| 3,994,048 A | 11/1976 | Rosenthal |
| 4,088,136 A | 5/1978 | Hasslinger et al. |
| 4,096,863 A | 6/1978 | Kaplan et al. |
| 4,177,961 A | 12/1979 | Gruenewald |
| 4,182,005 A | 1/1980 | Harrington |
| 4,285,486 A | 8/1981 | Van Osten et al. |
| 4,442,984 A | 4/1984 | Bayat |
| 4,501,400 A | 2/1985 | Leonardo |
| 4,700,432 A | 10/1987 | Fennell |
| 5,031,282 A | 7/1991 | Denard |
| 5,075,932 A | 12/1991 | Hunt et al. |
| 5,142,743 A | 9/1992 | Hahn |
| 5,168,603 A | 12/1992 | Reed |
| 5,548,871 A | 8/1996 | Trethewey |
| 5,560,564 A | * 10/1996 | Maynard ..................... 242/402 |
| 5,745,958 A | 5/1998 | Kaldor |
| 5,802,676 A | 9/1998 | Tolan |
| 5,881,436 A | 3/1999 | Lyons |
| 5,920,965 A | 7/1999 | Kleban |
| 6,003,803 A | 12/1999 | Knapp et al. |

* cited by examiner

Primary Examiner—Robert J. Sandy

(57) ABSTRACT

A bundling device designed for ideal use in the field that it is designed to aid in the management, storage, and protection of a wide range of a line type material. Bundling device is designed to be easy to operate, inexpensive to produce, compact, and durable. Bundling device comprising of a reusable body that is formed so as to be firmly disposed to a segmented portion of line type material. Bundling device comprises of a bundling strap designed so that it may effectively hold a wide range of personally sized coiled lengths of line type material. Body may be designed so that it may be firmly disposed to an electrical extension cord set, or an electrical extension cord, or a coaxial cable, or a rope, or a set of battery jumper cables, or a tow strap, or a like line type material. Bundling device may also be incorporated into an existing device that is already firmly disposed to a segmented portion of line type material such as an electrical extension cord plug, or an electrical extension cord strain relief.

10 Claims, 34 Drawing Sheets

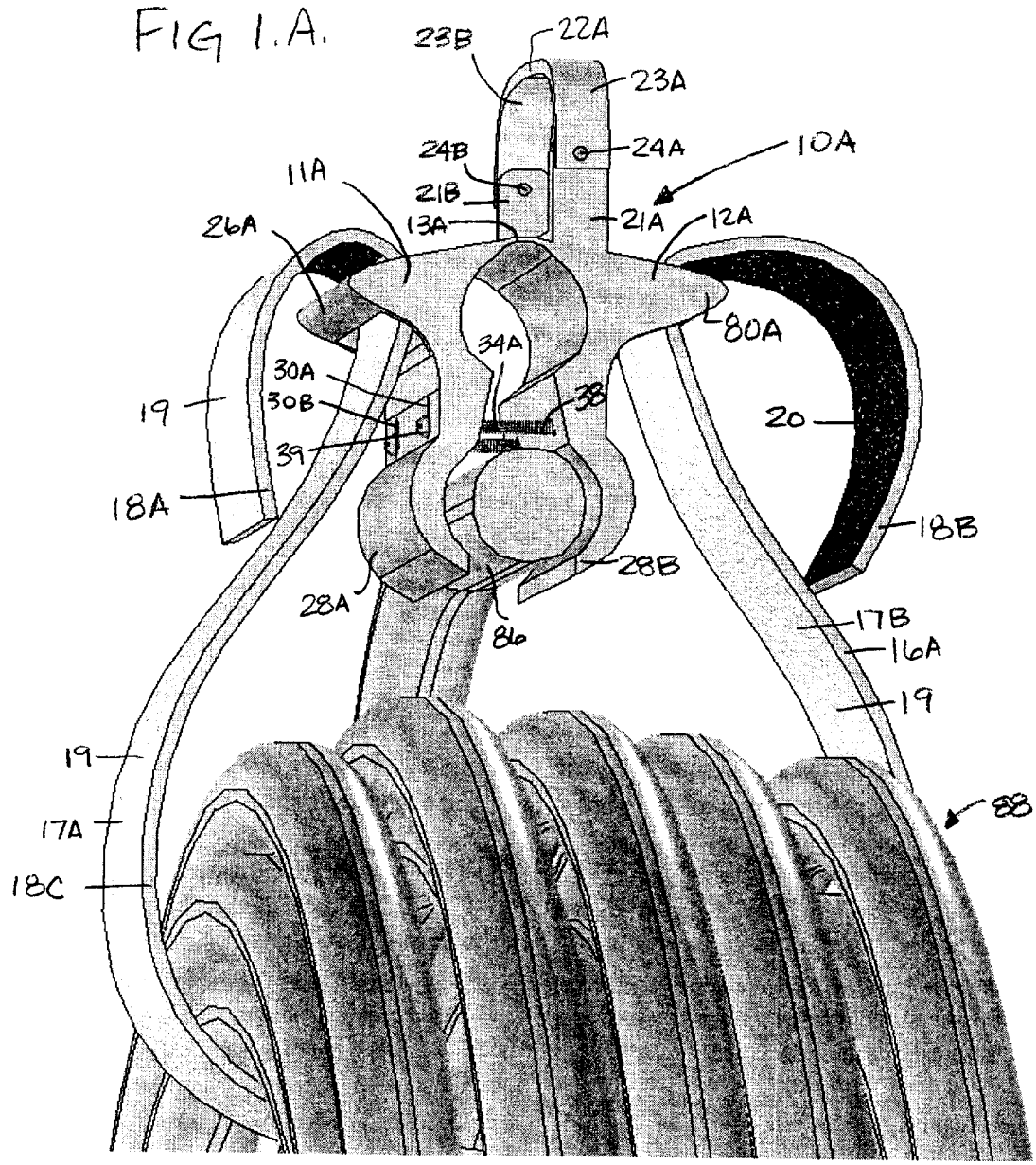

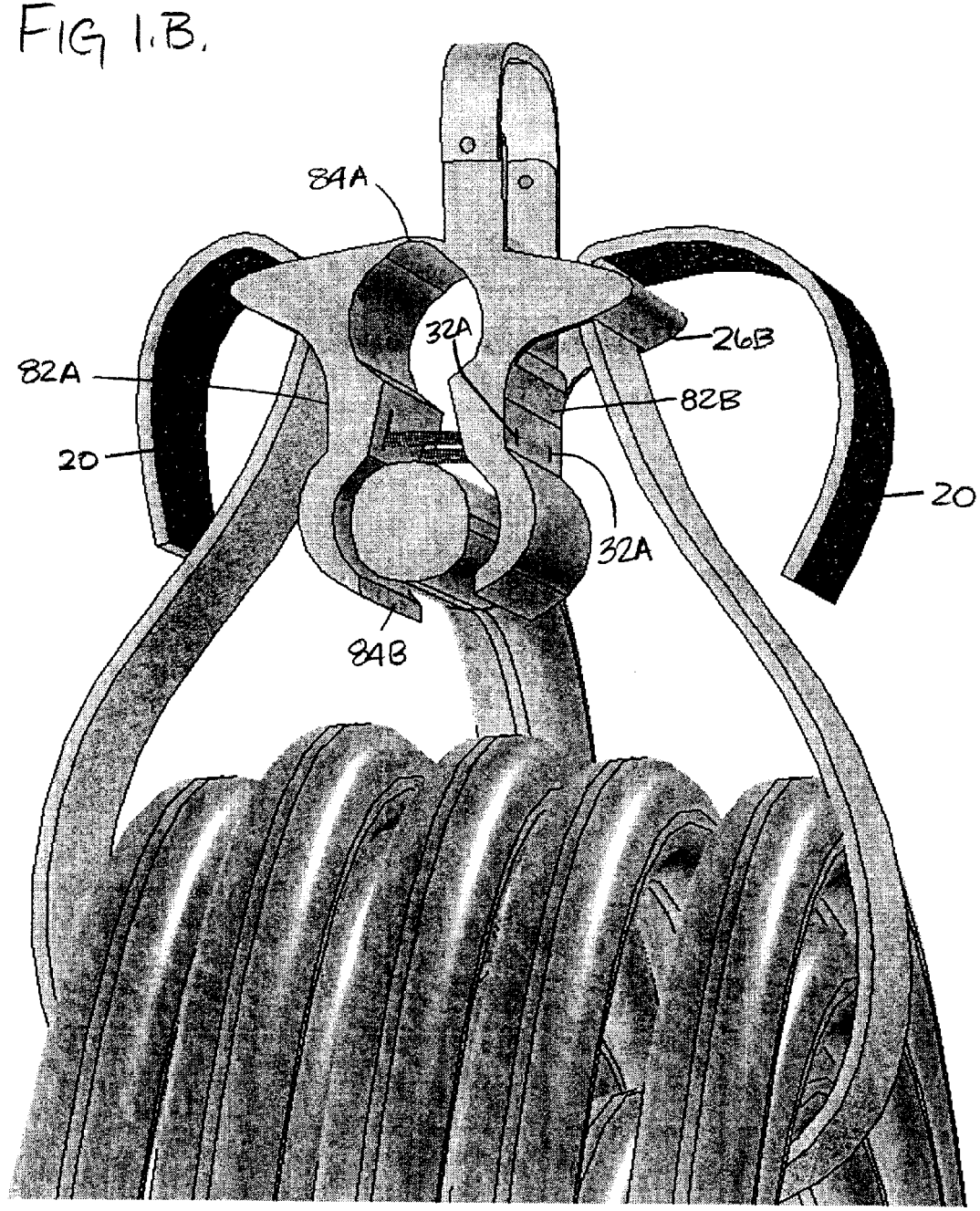
FIG 1.B.

FIG 1.C.
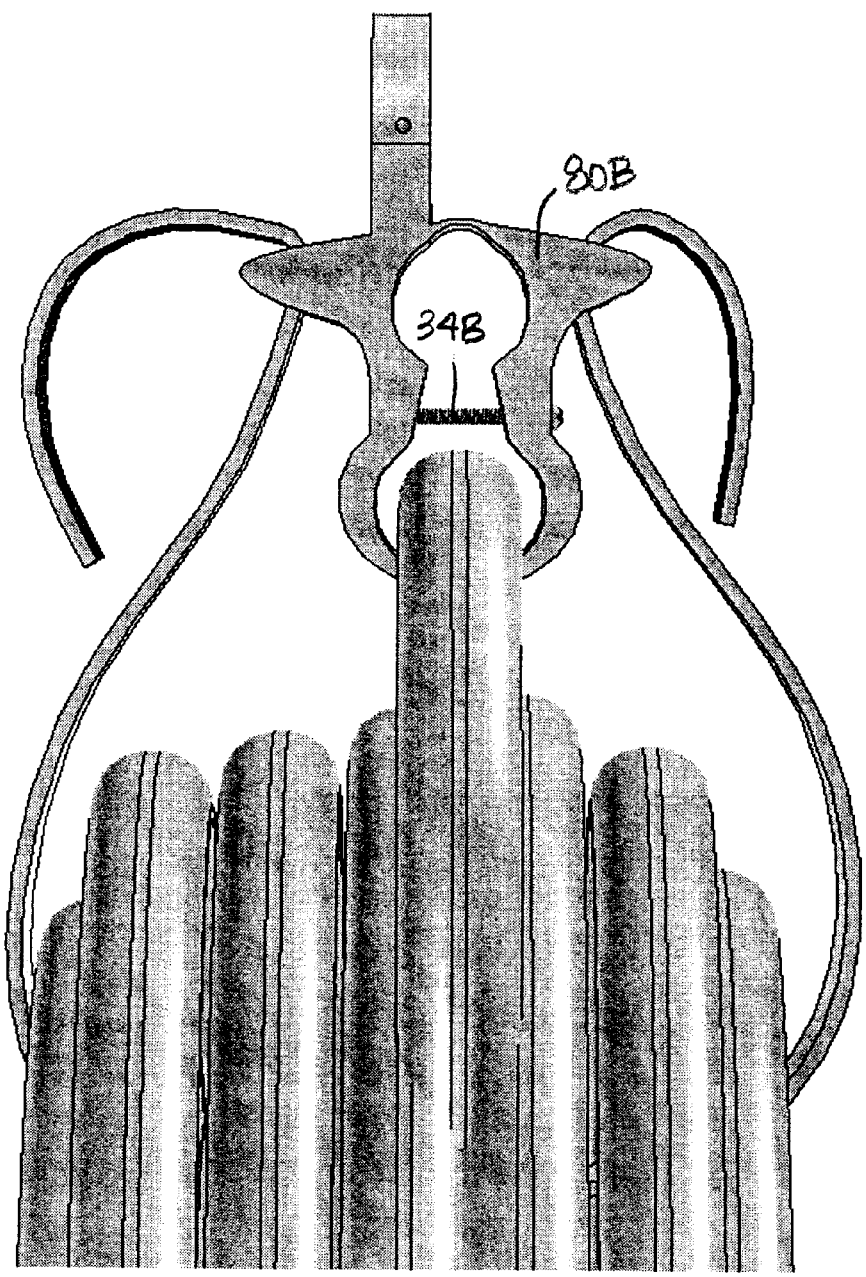

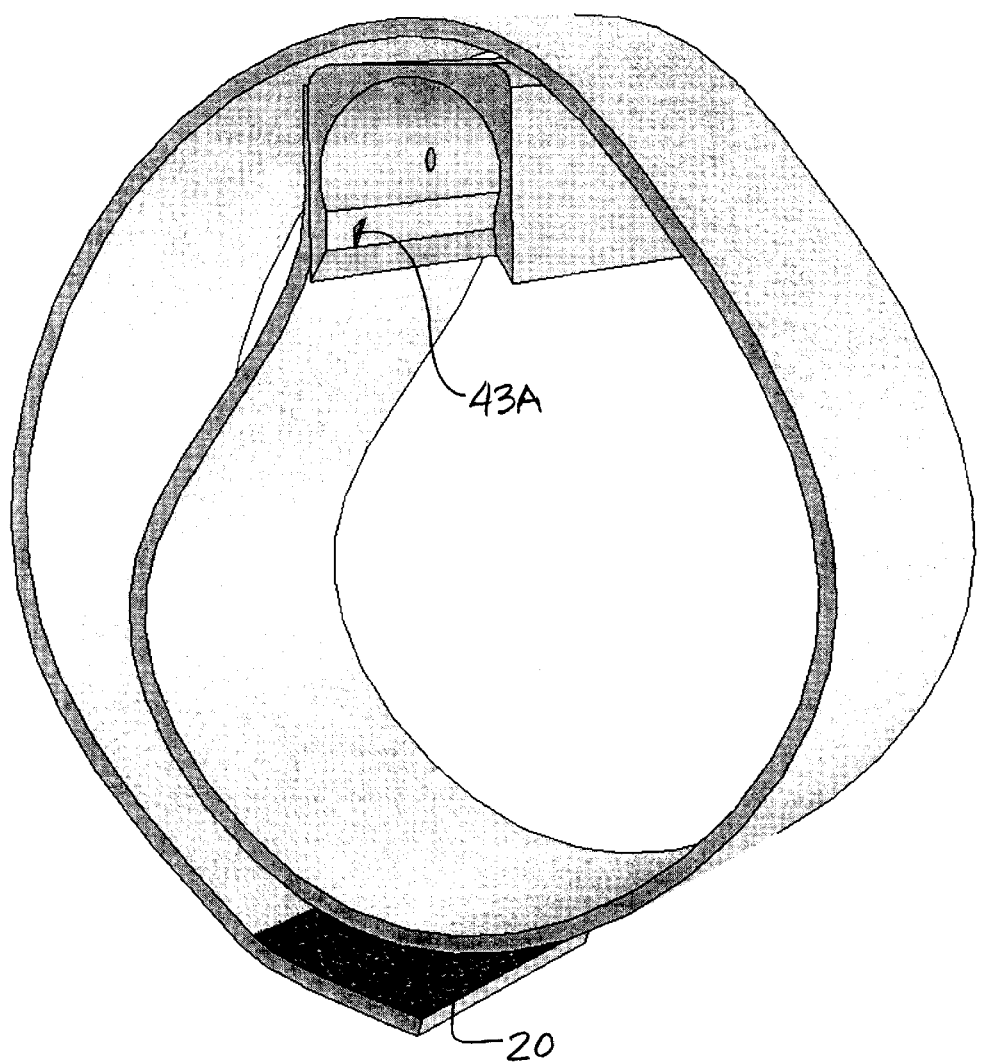
FIG 2.A.

FIG 3.A.
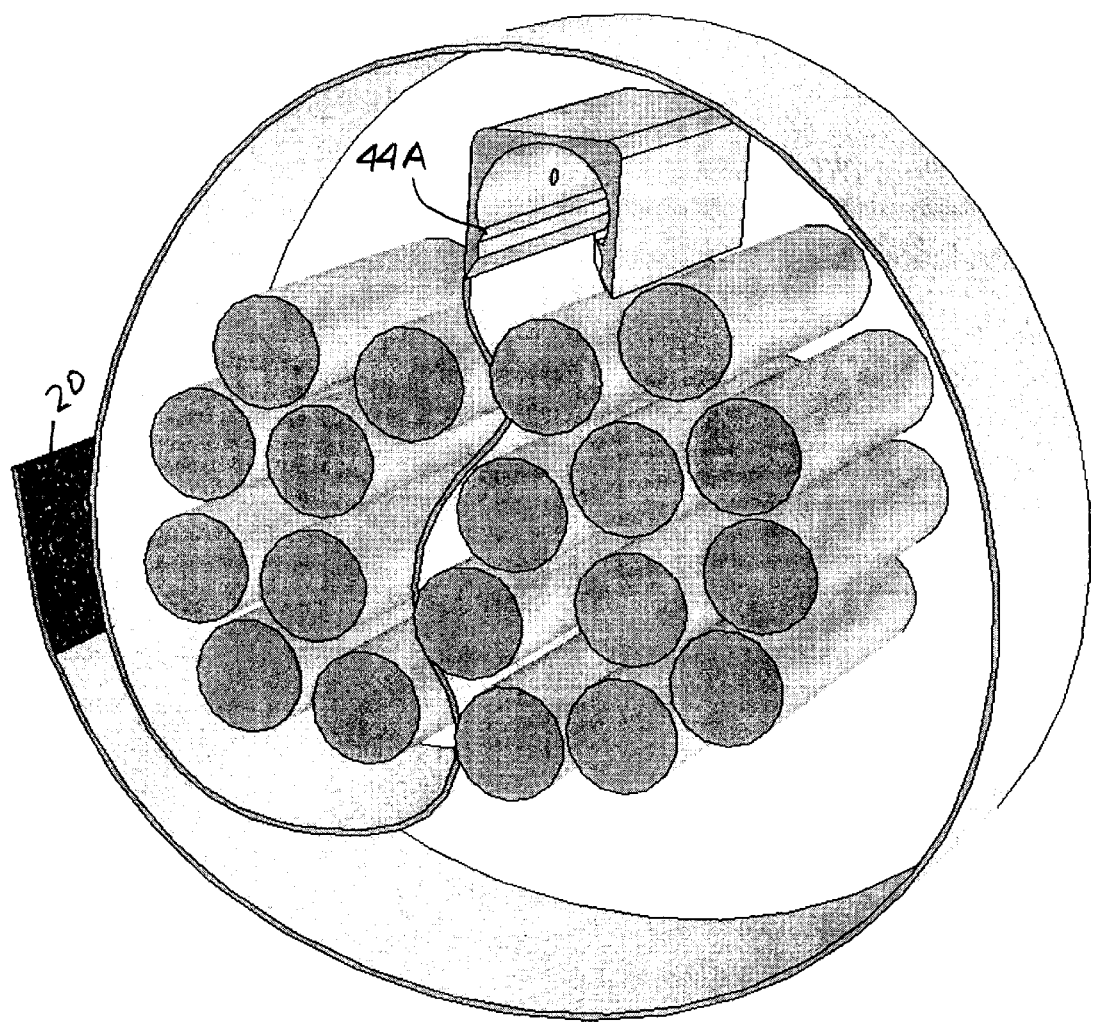

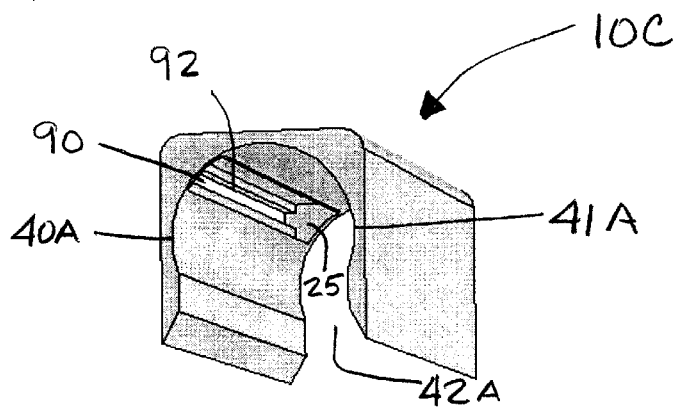
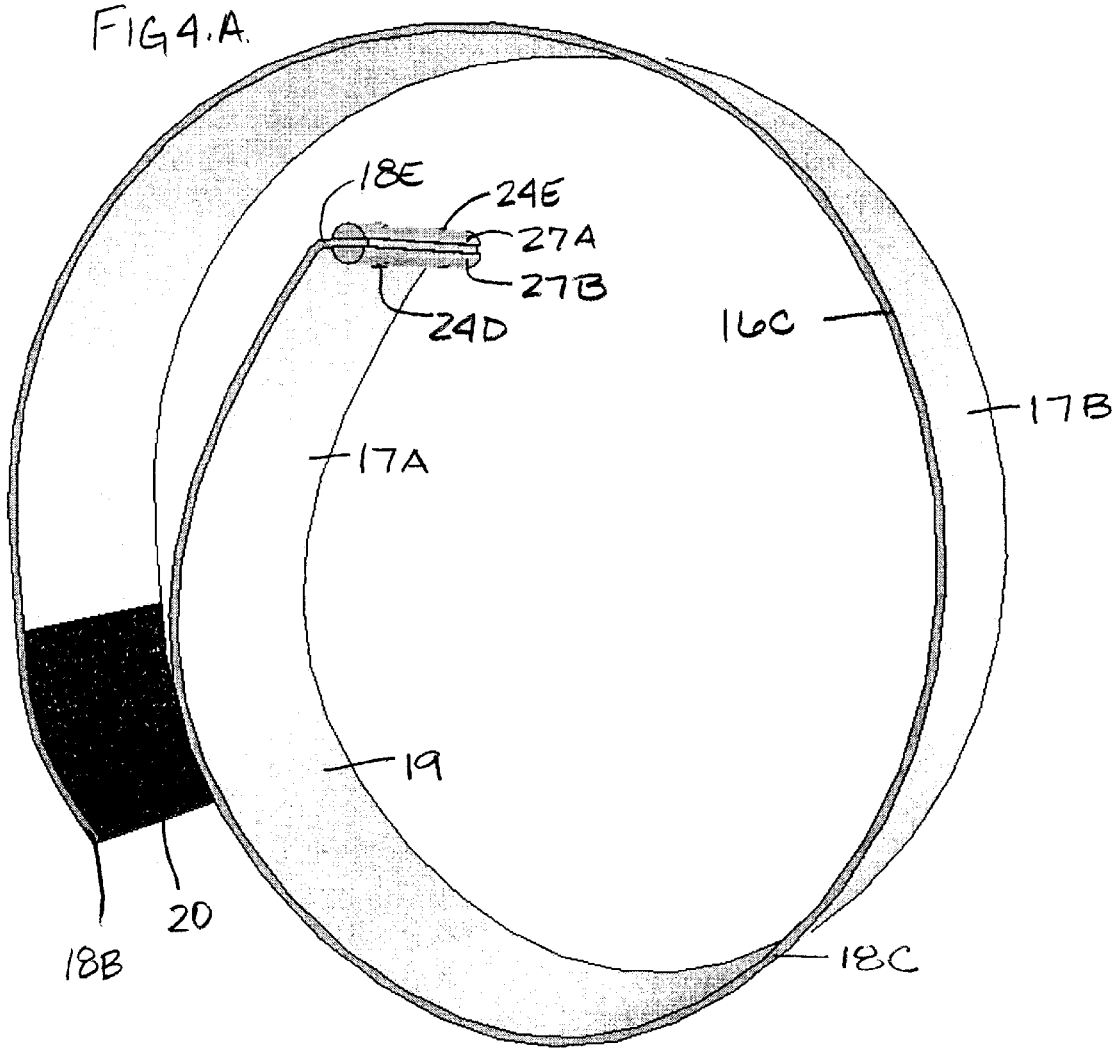

FIG 4.B.
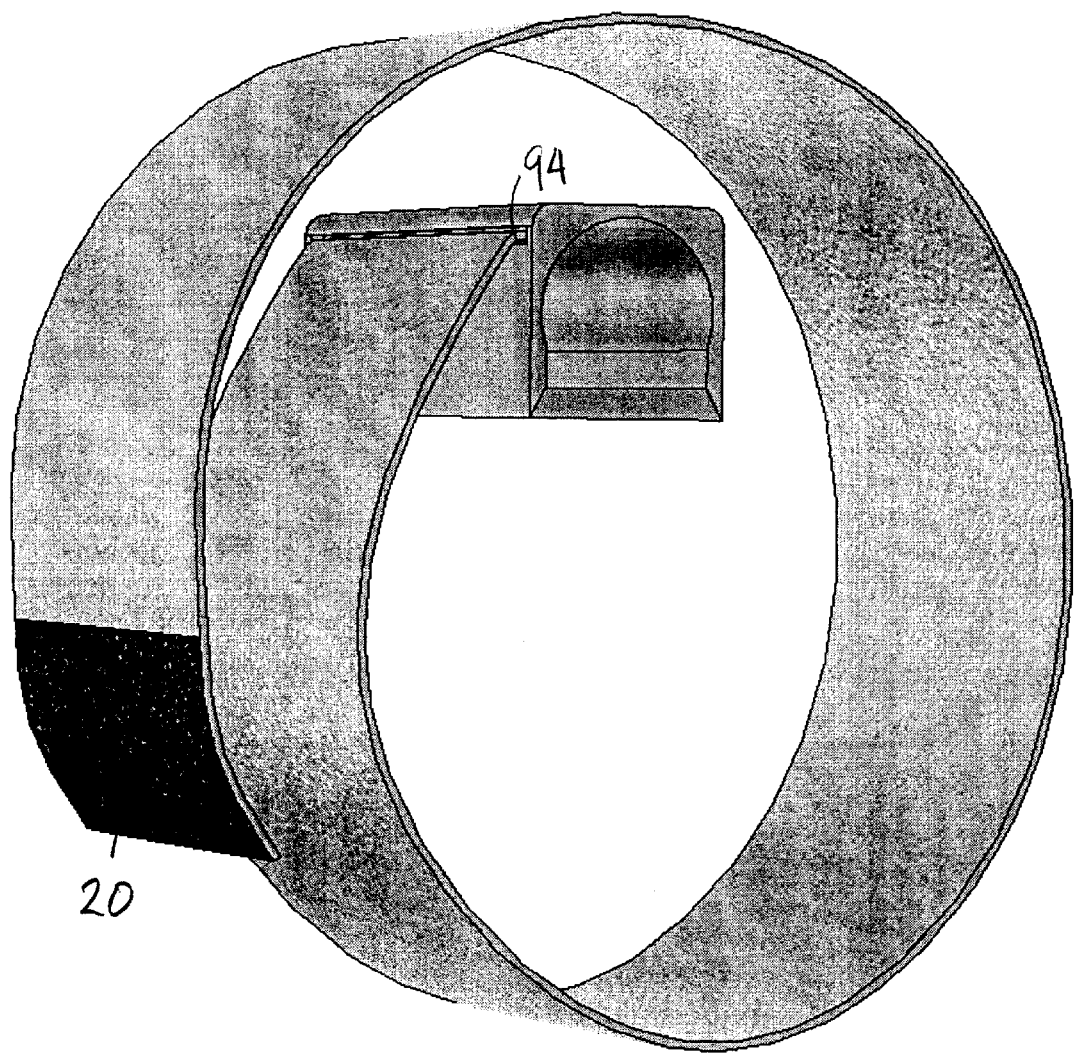

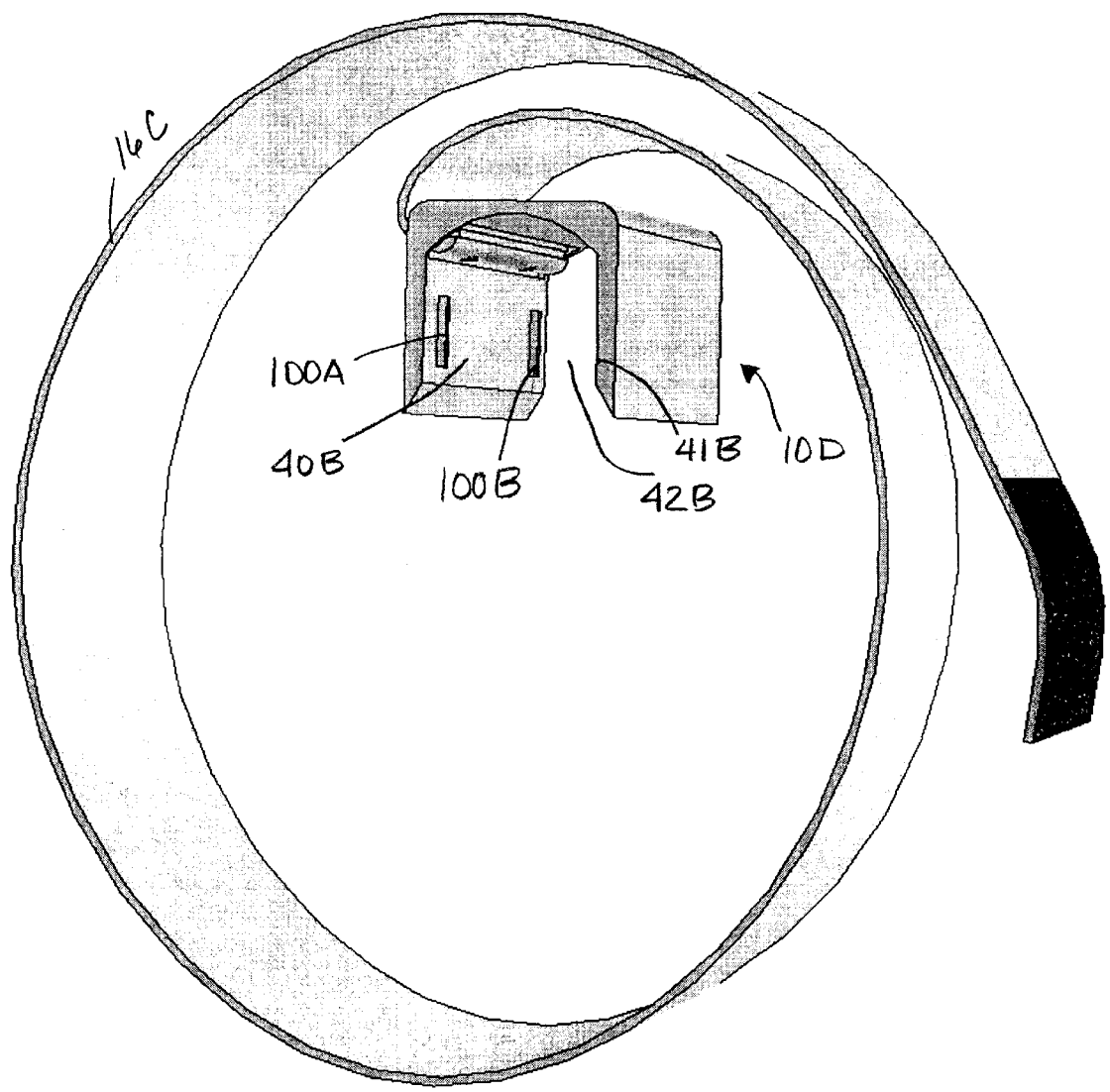
FIG 4.C.

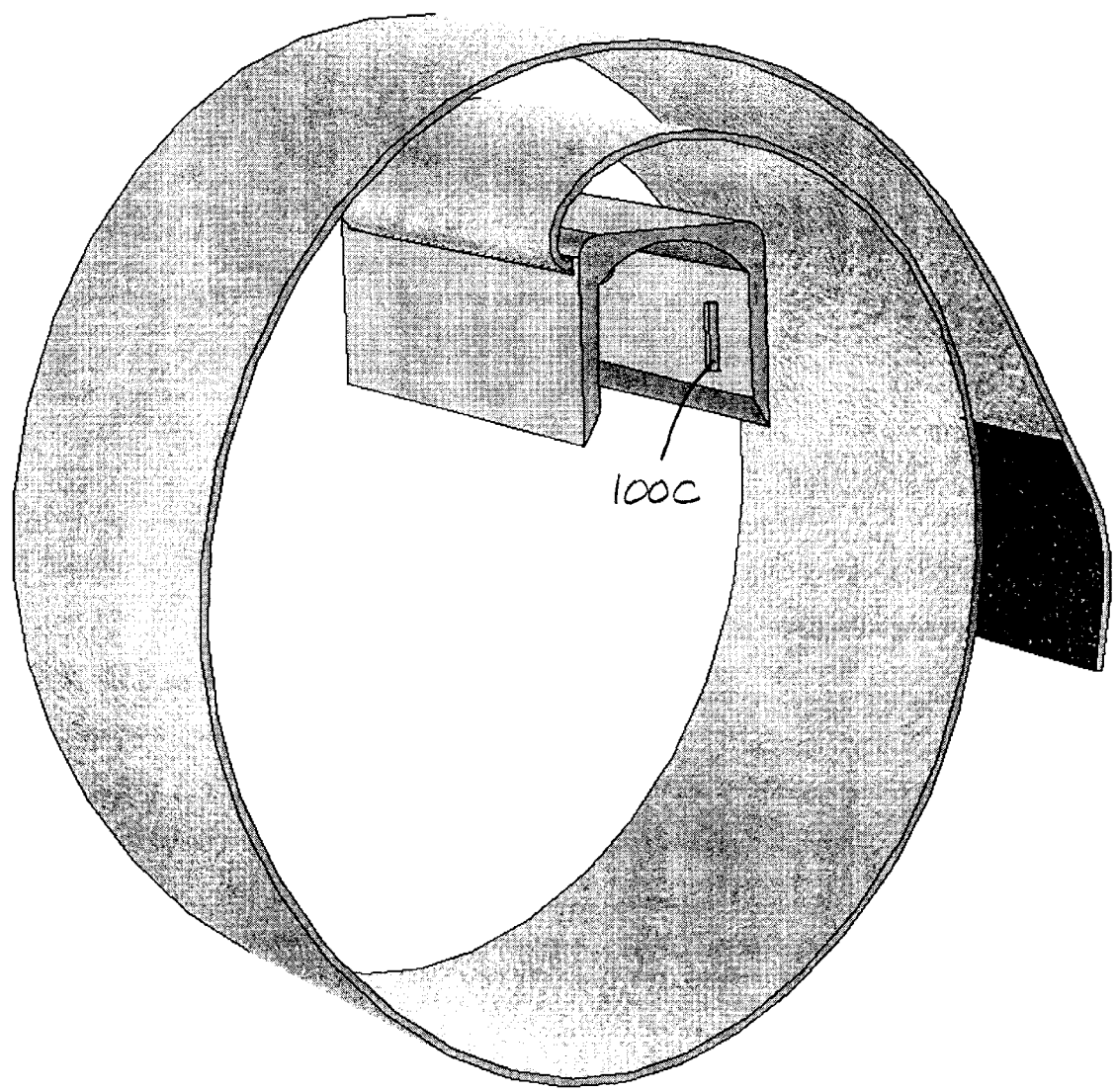
FIG 4.D.

FIG 5.A.
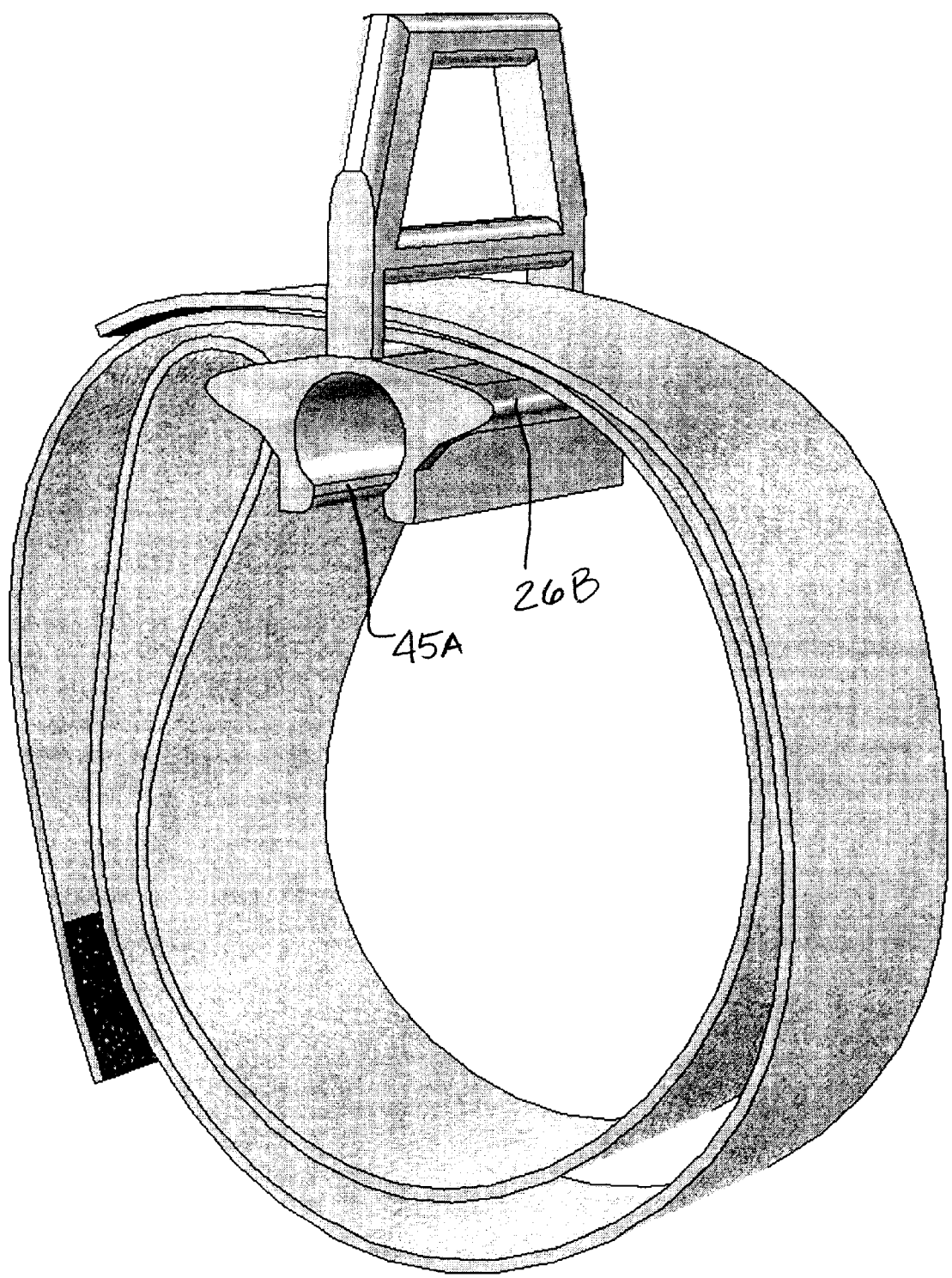

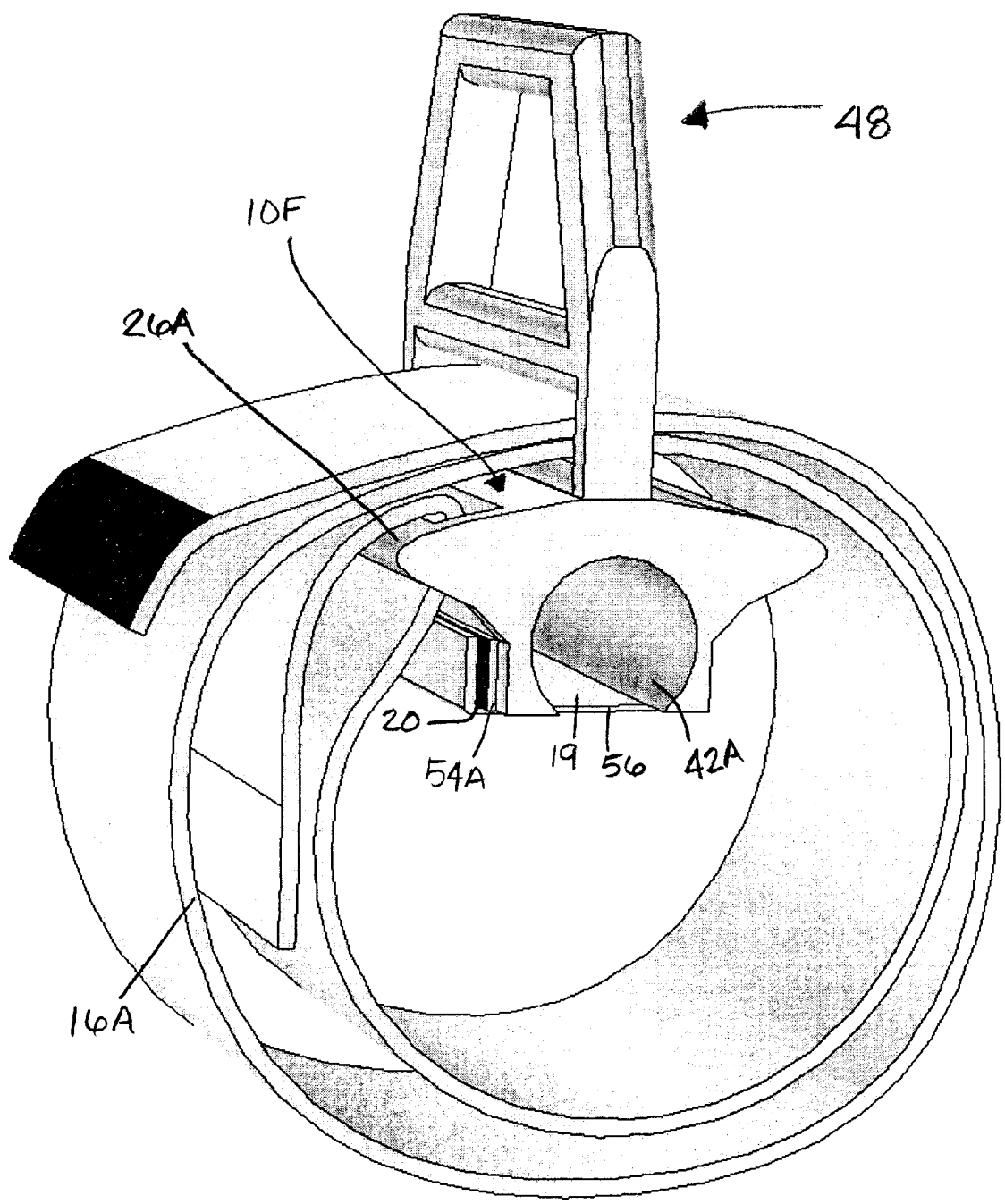
FIG 5.C.

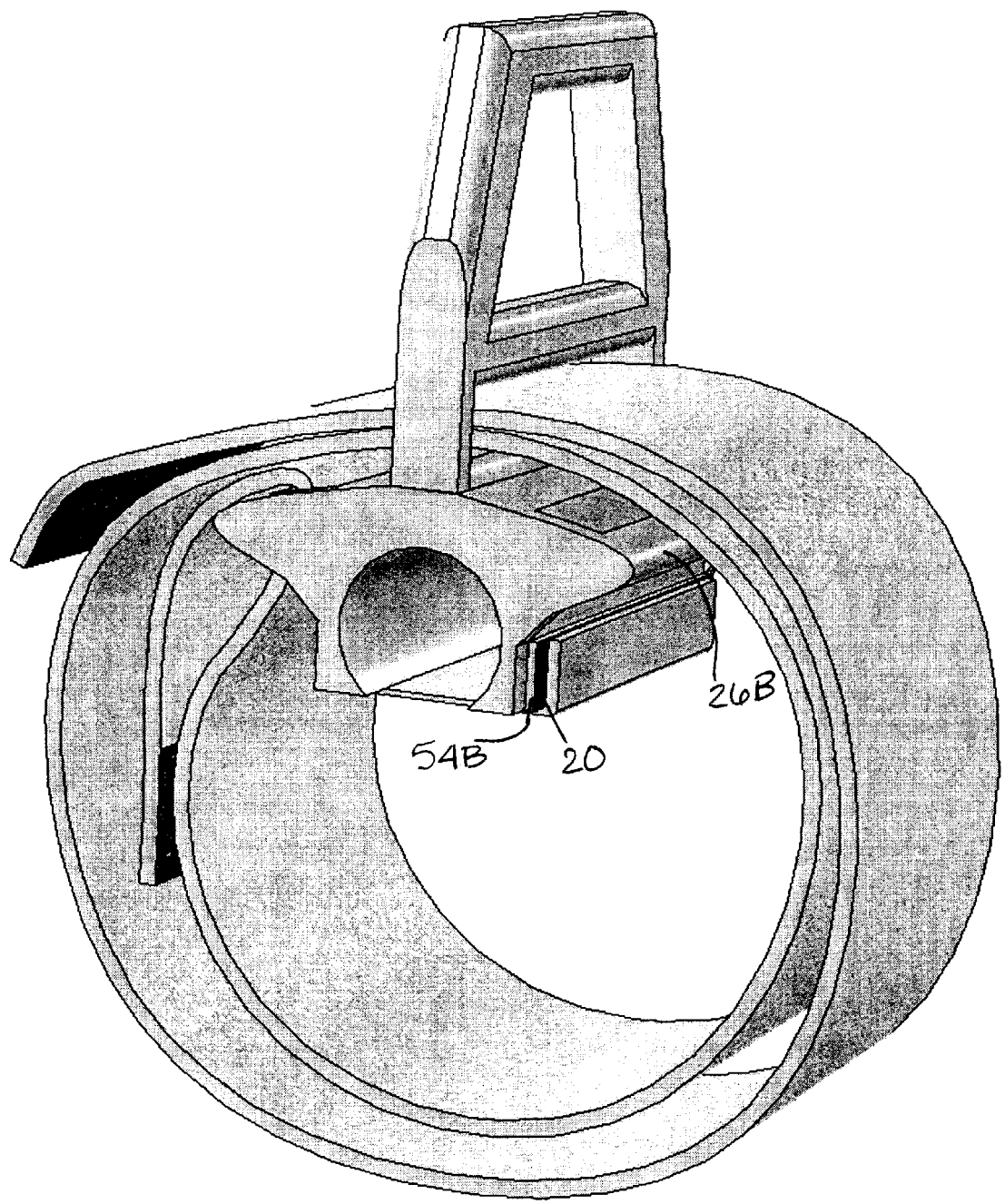
FIG 5.D.

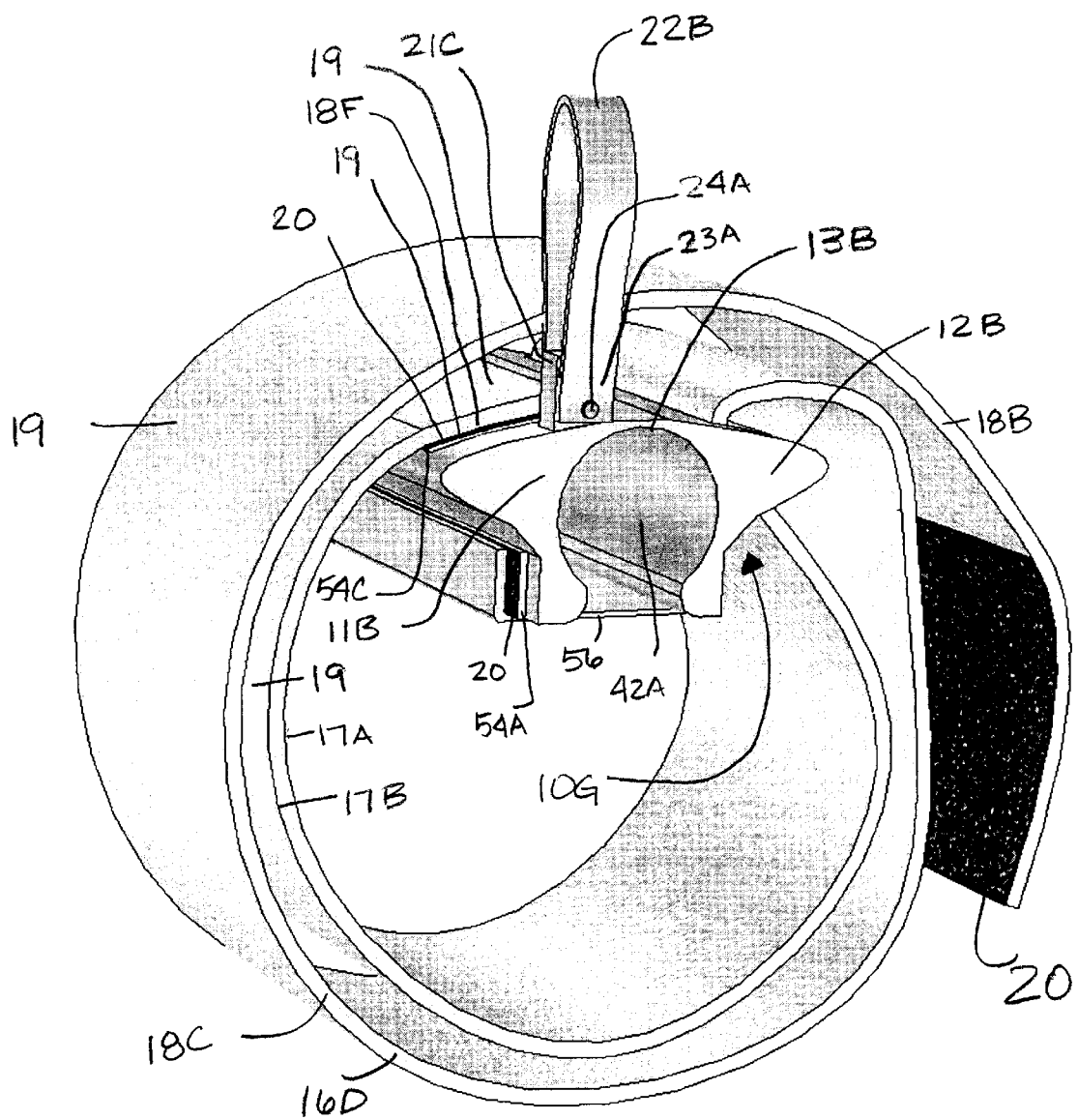

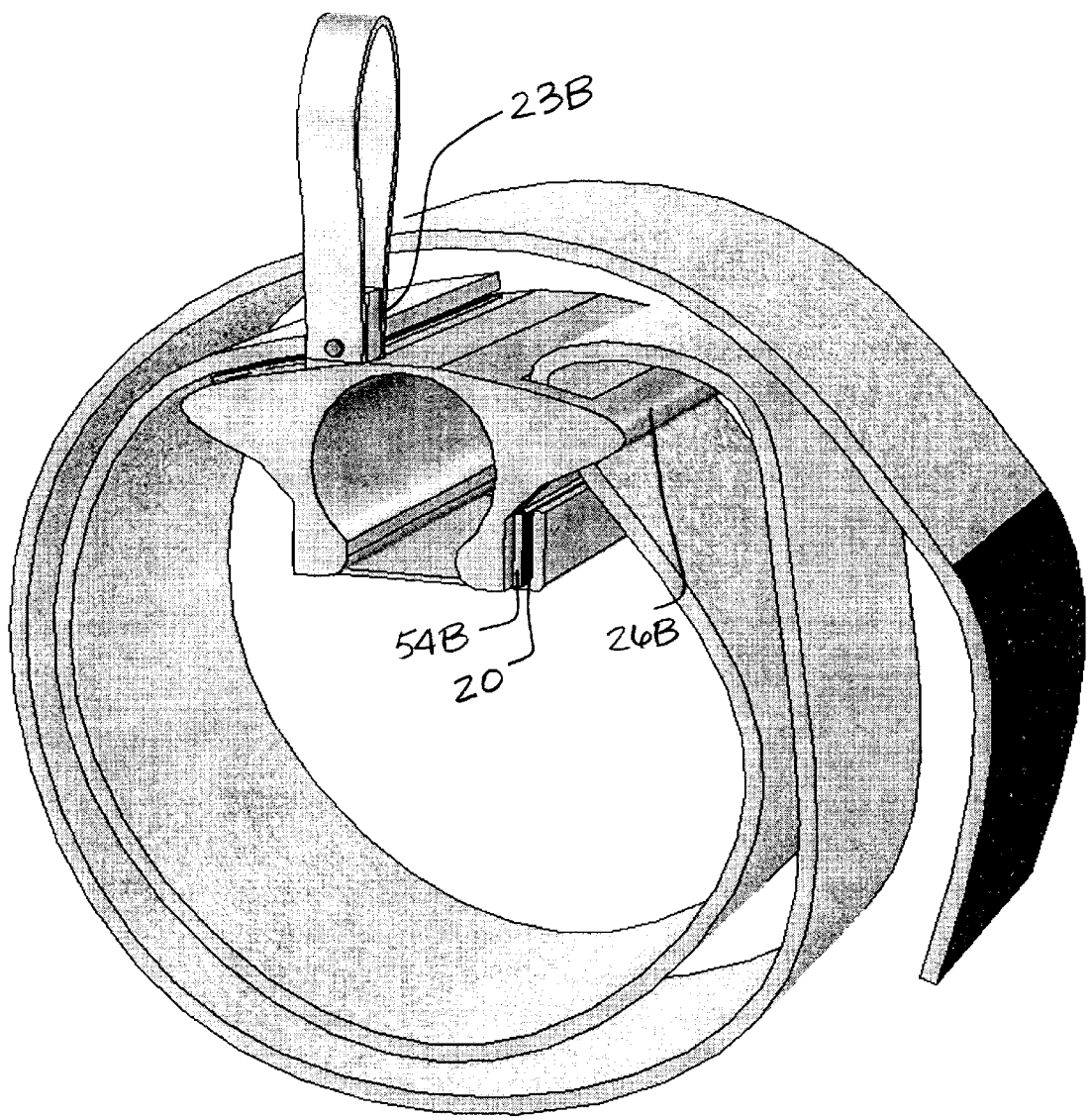
FIG 5.F.

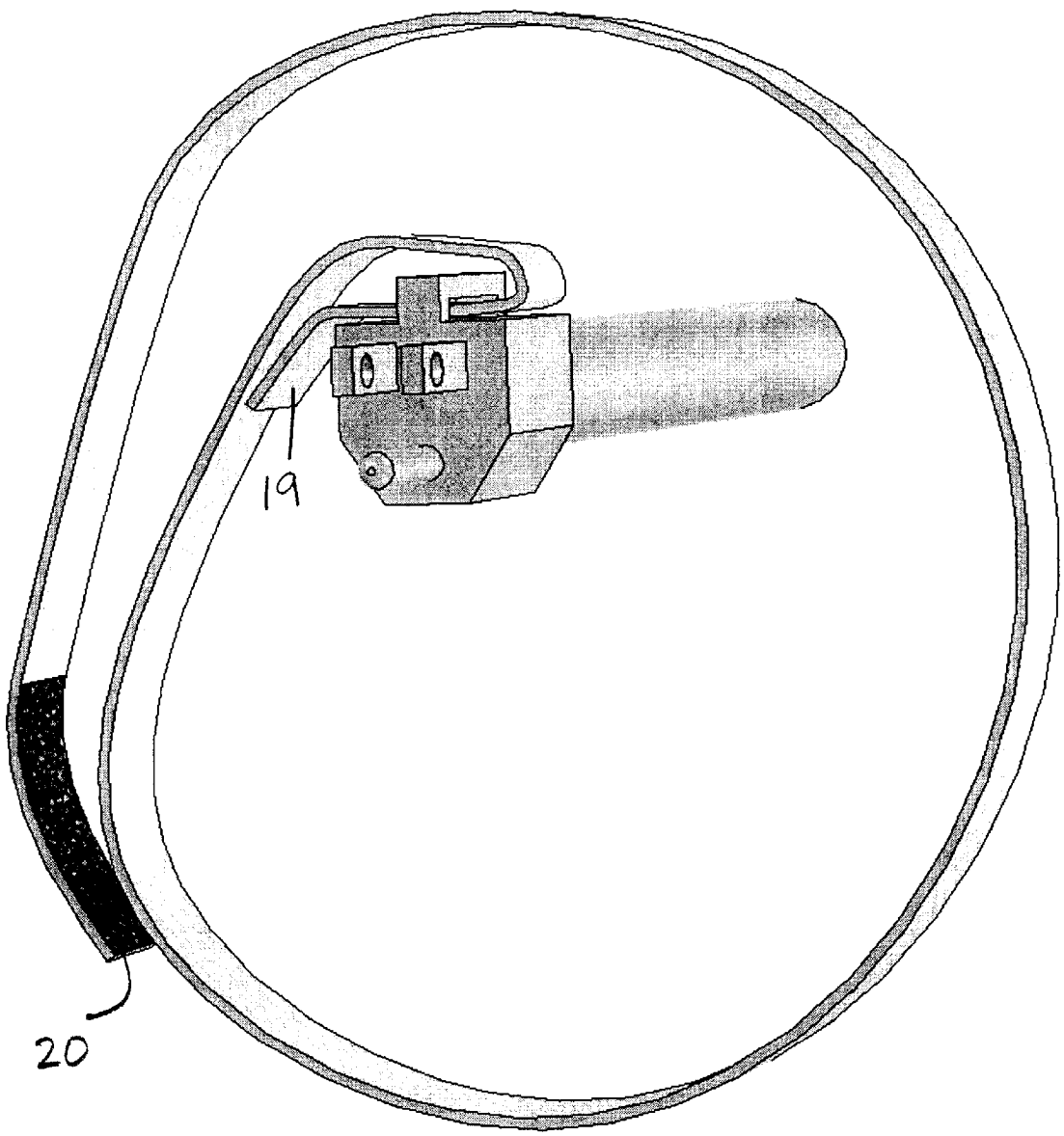
FIG 6.A.

FIG 6.B.
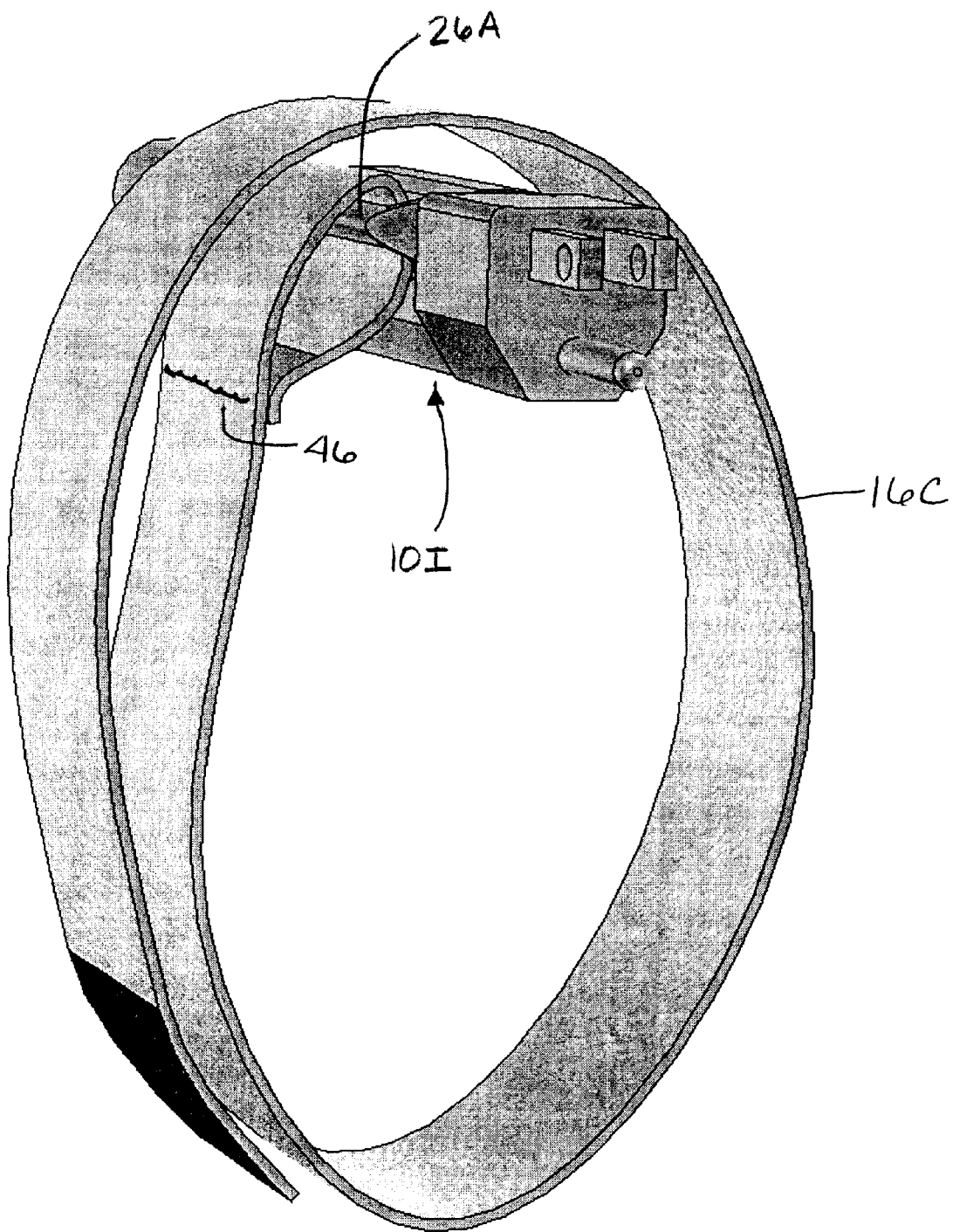

FIG 6.C.
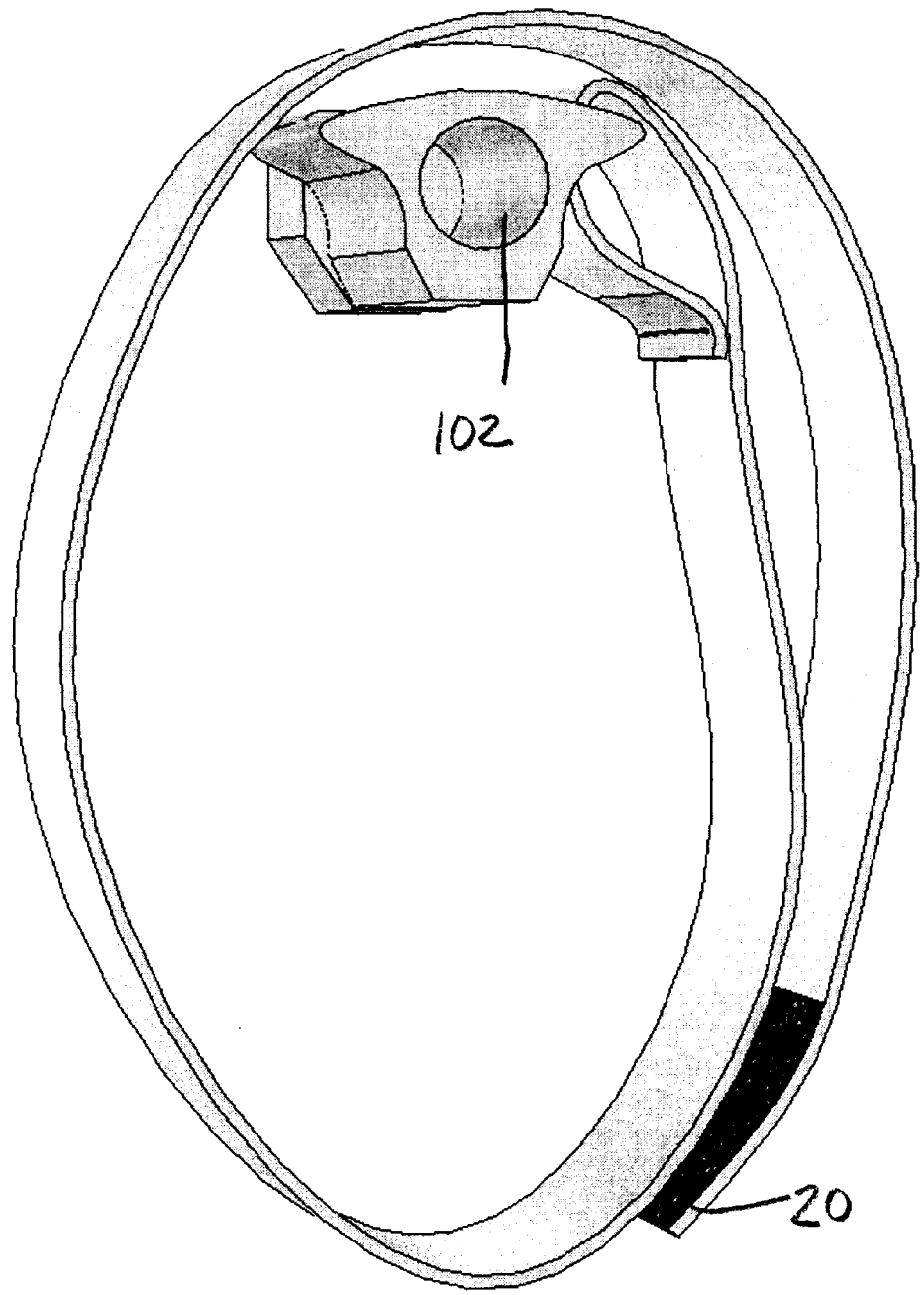

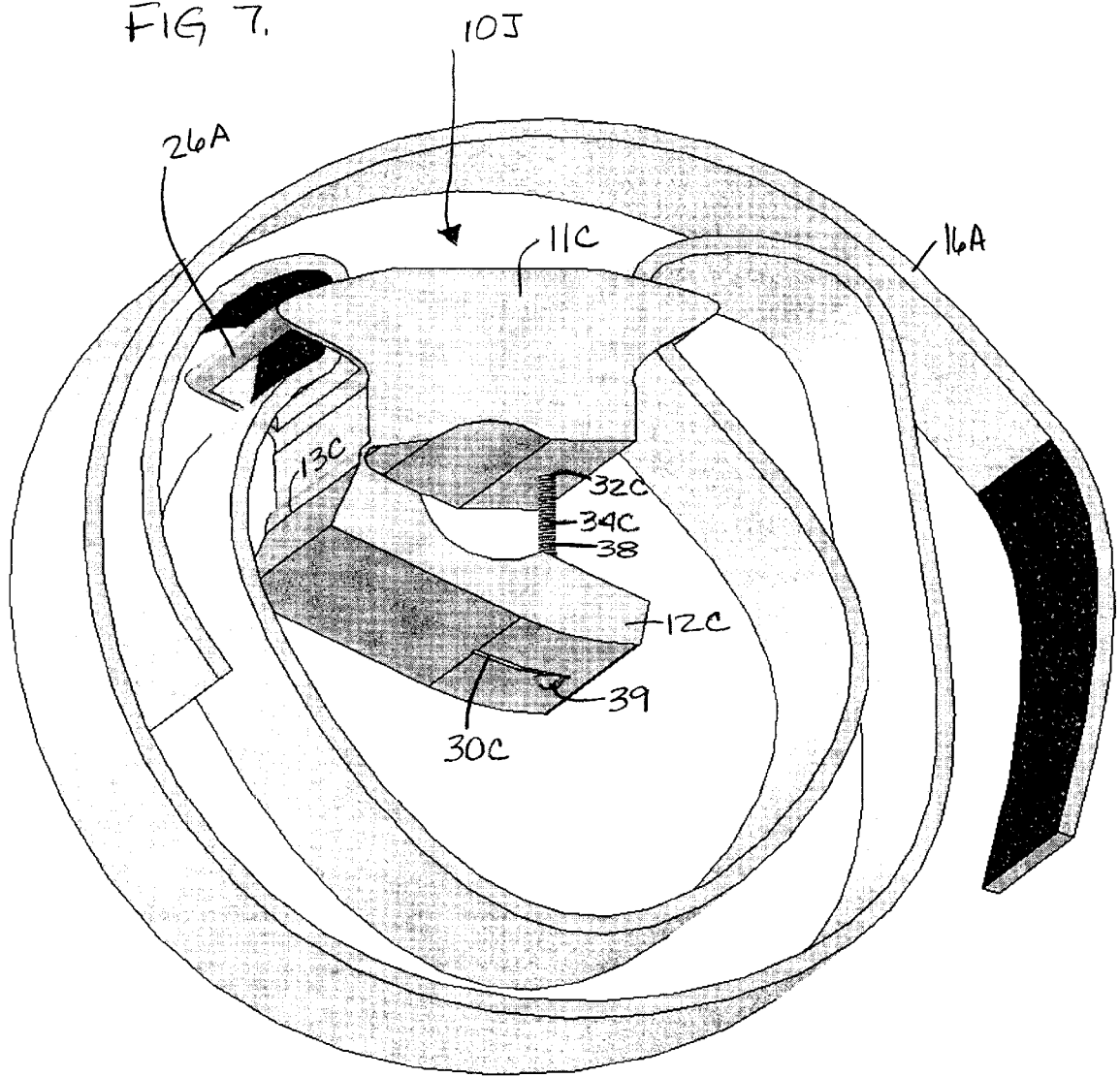

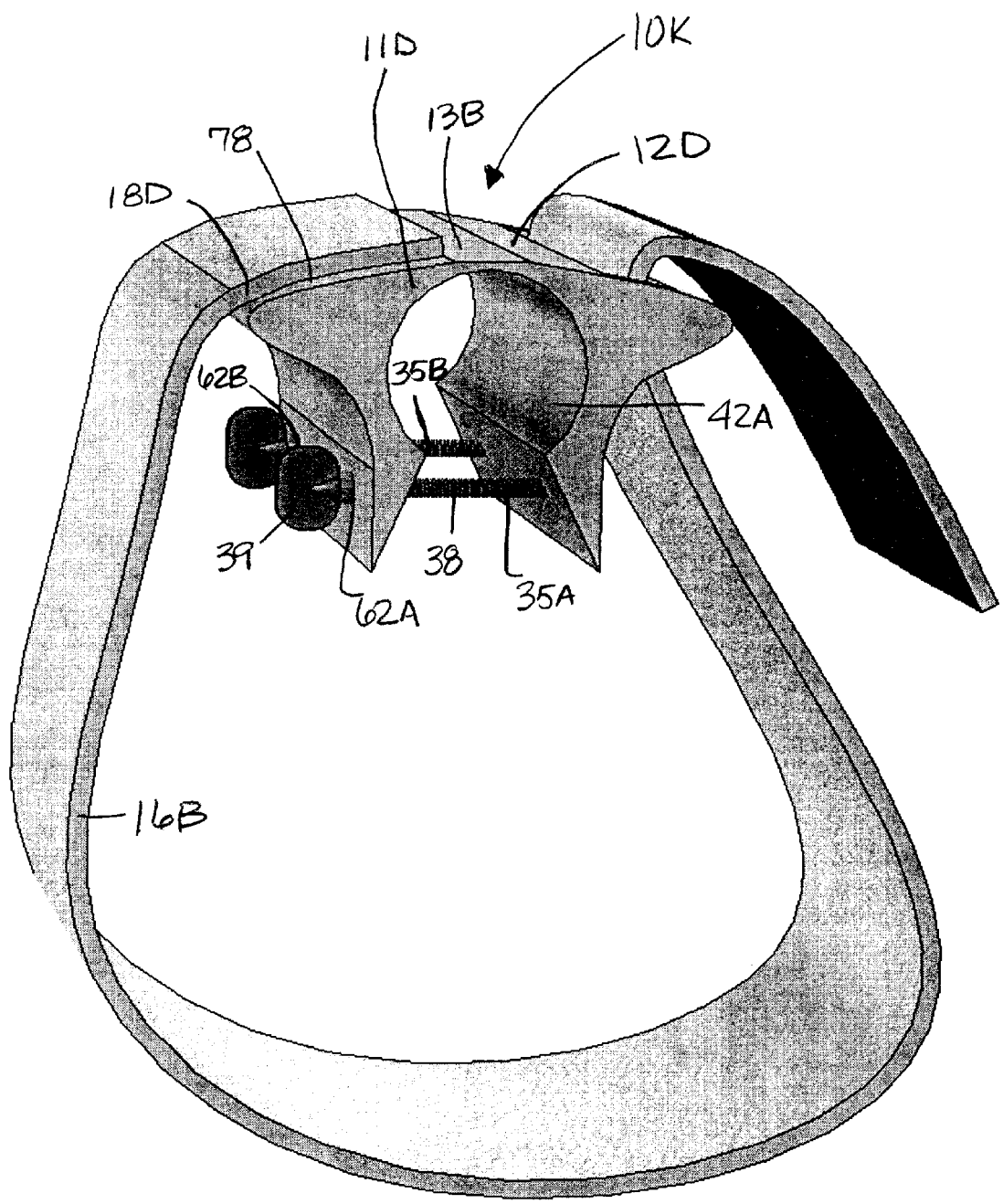

FIG 8.A.
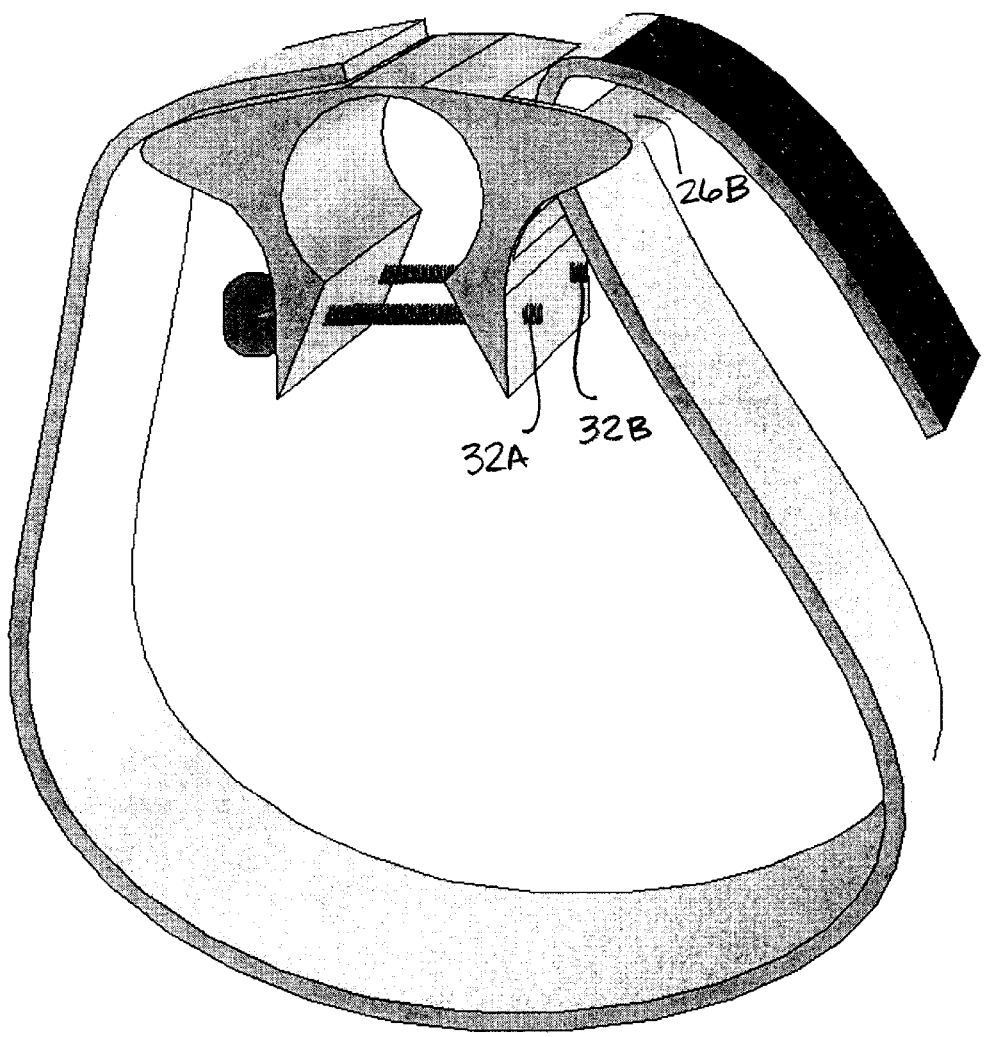

FIG 9.A.
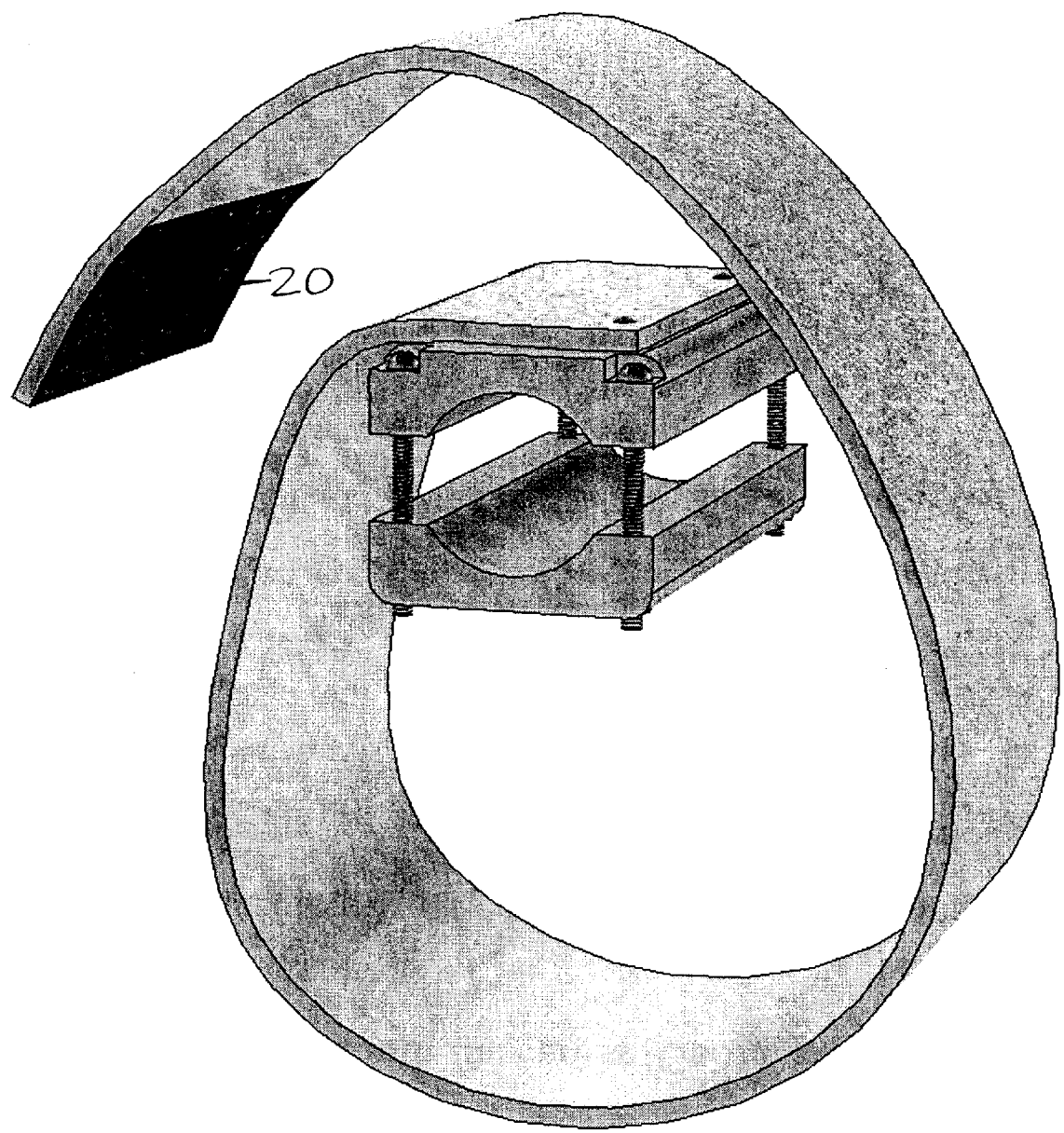

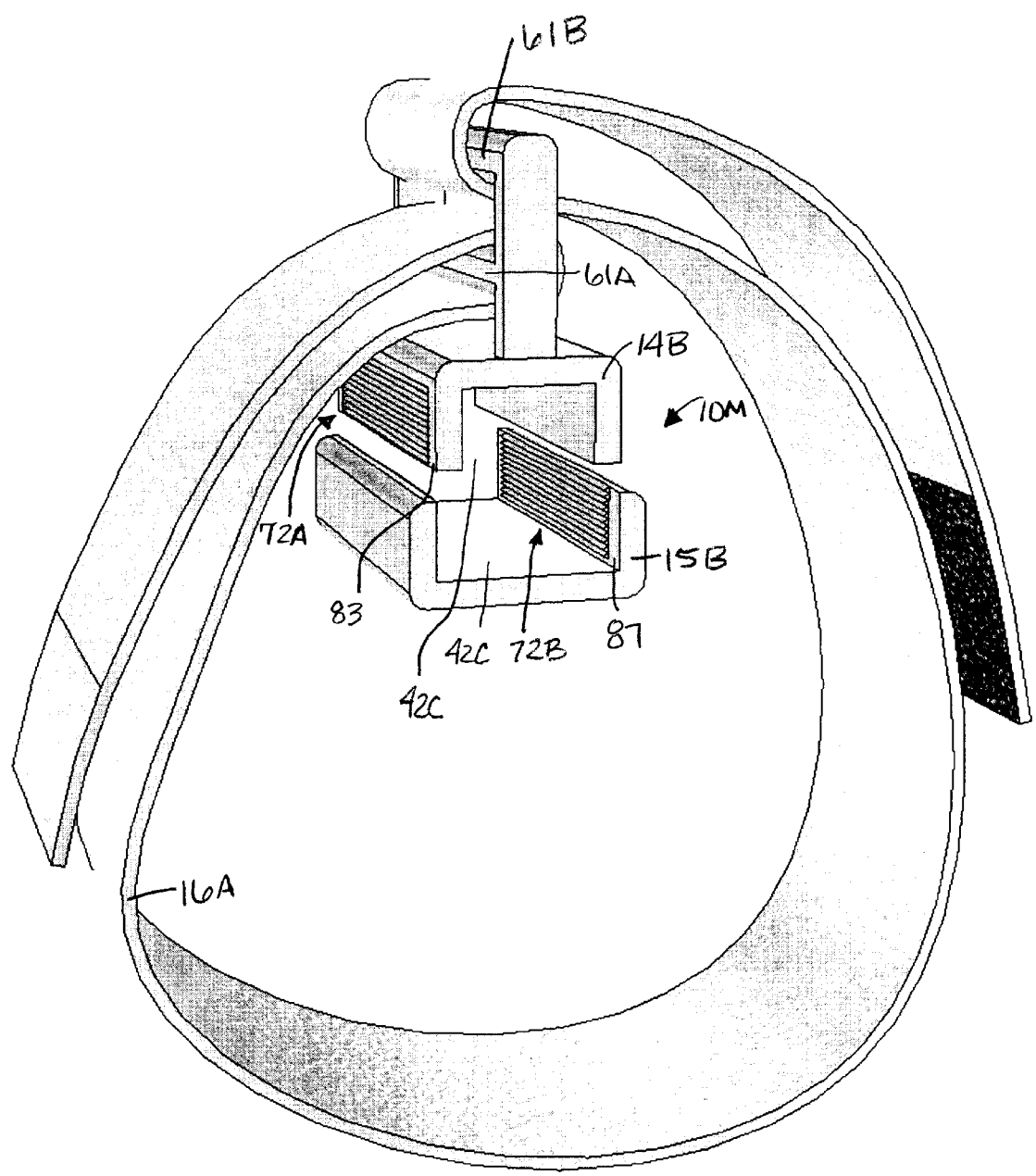

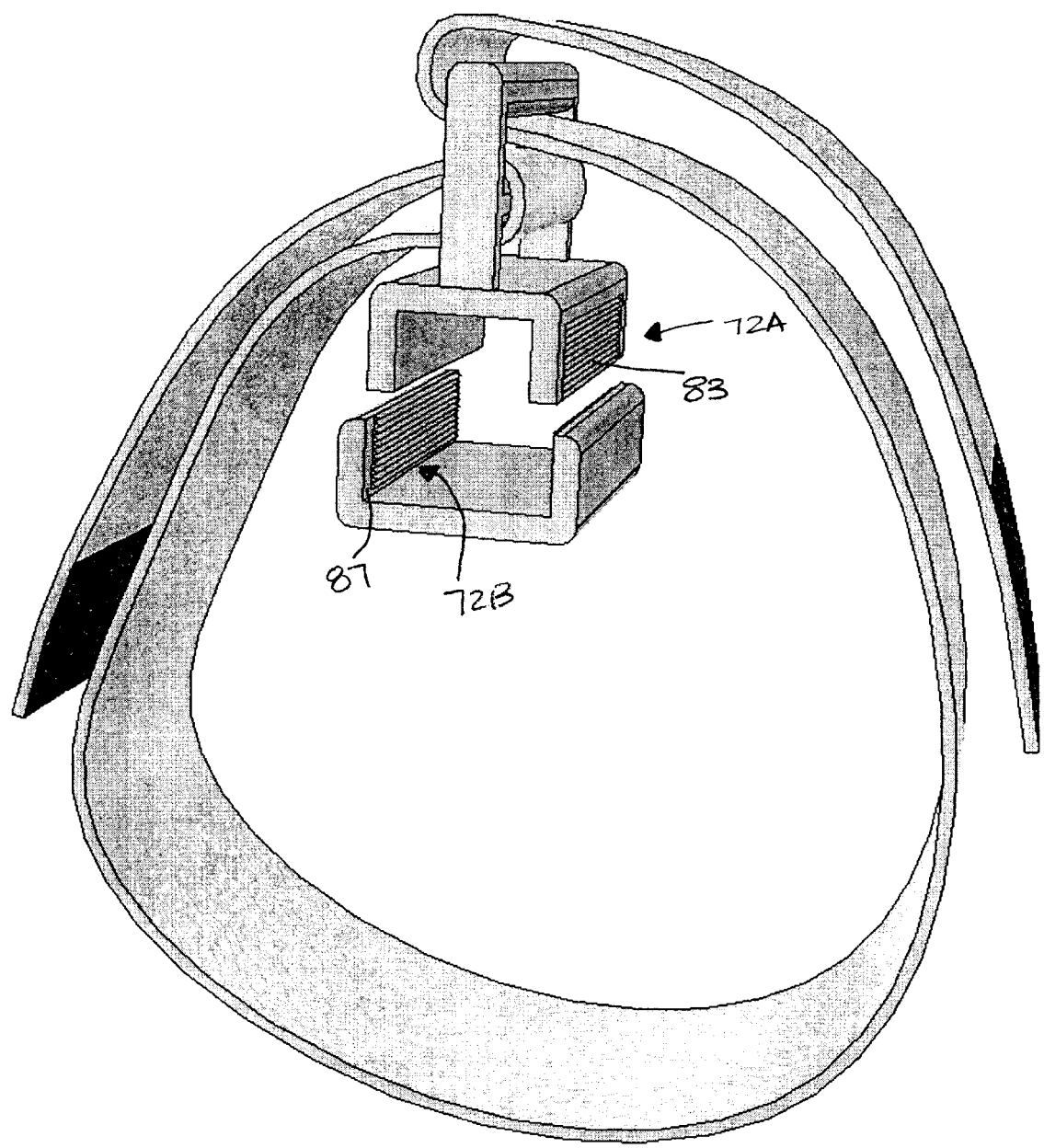
Fig 9.C.

FIG 9.D.
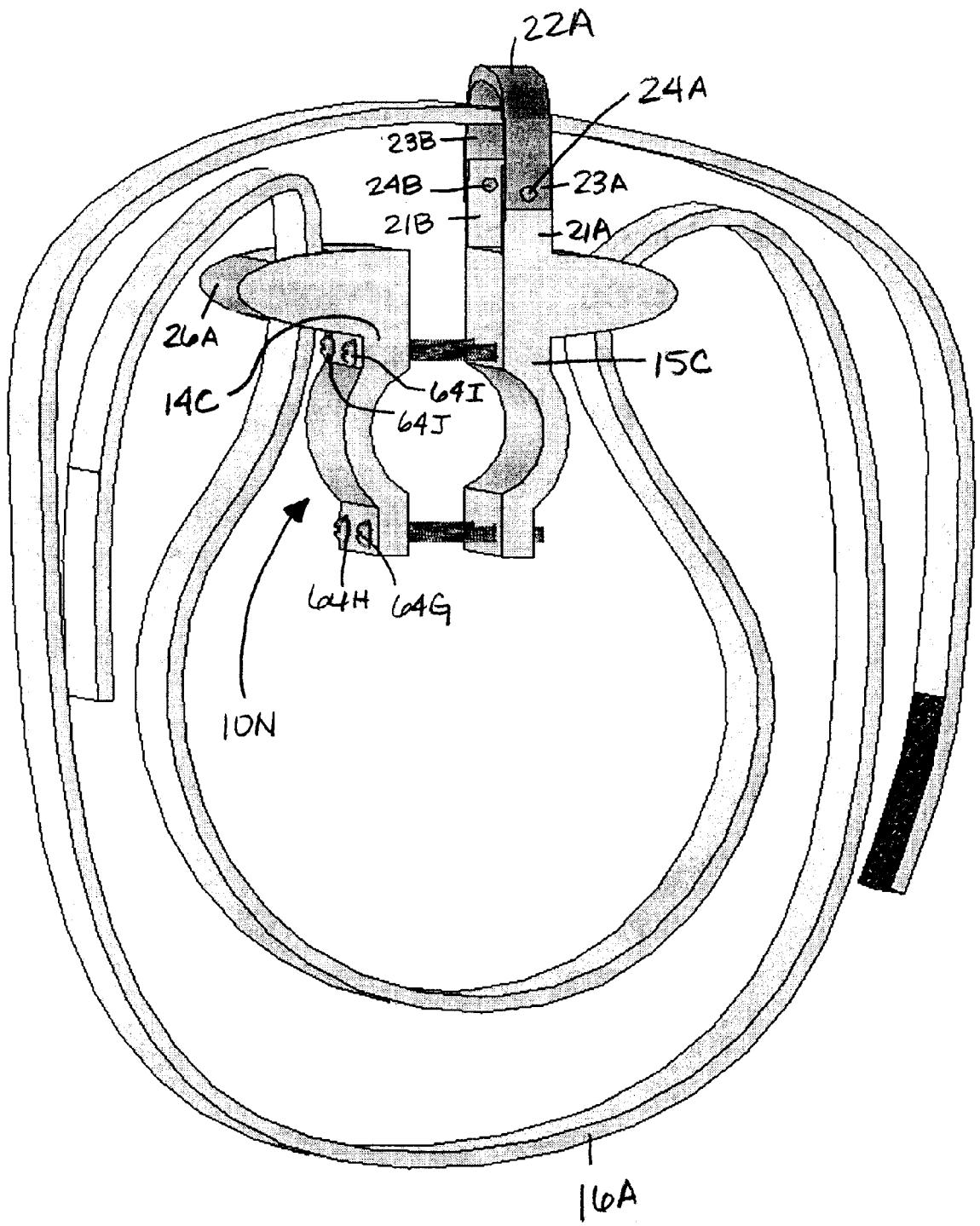

Fig 9.E
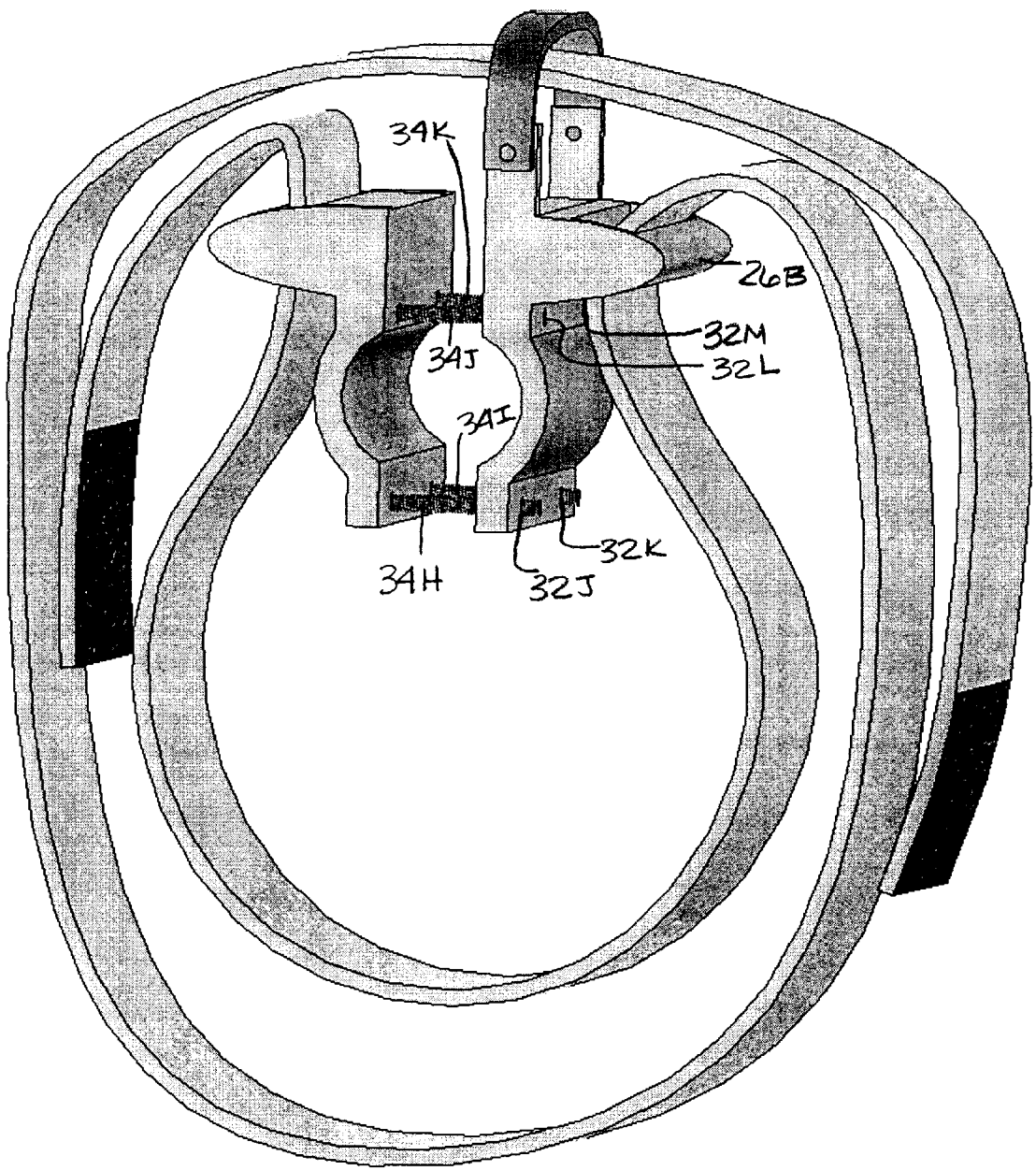

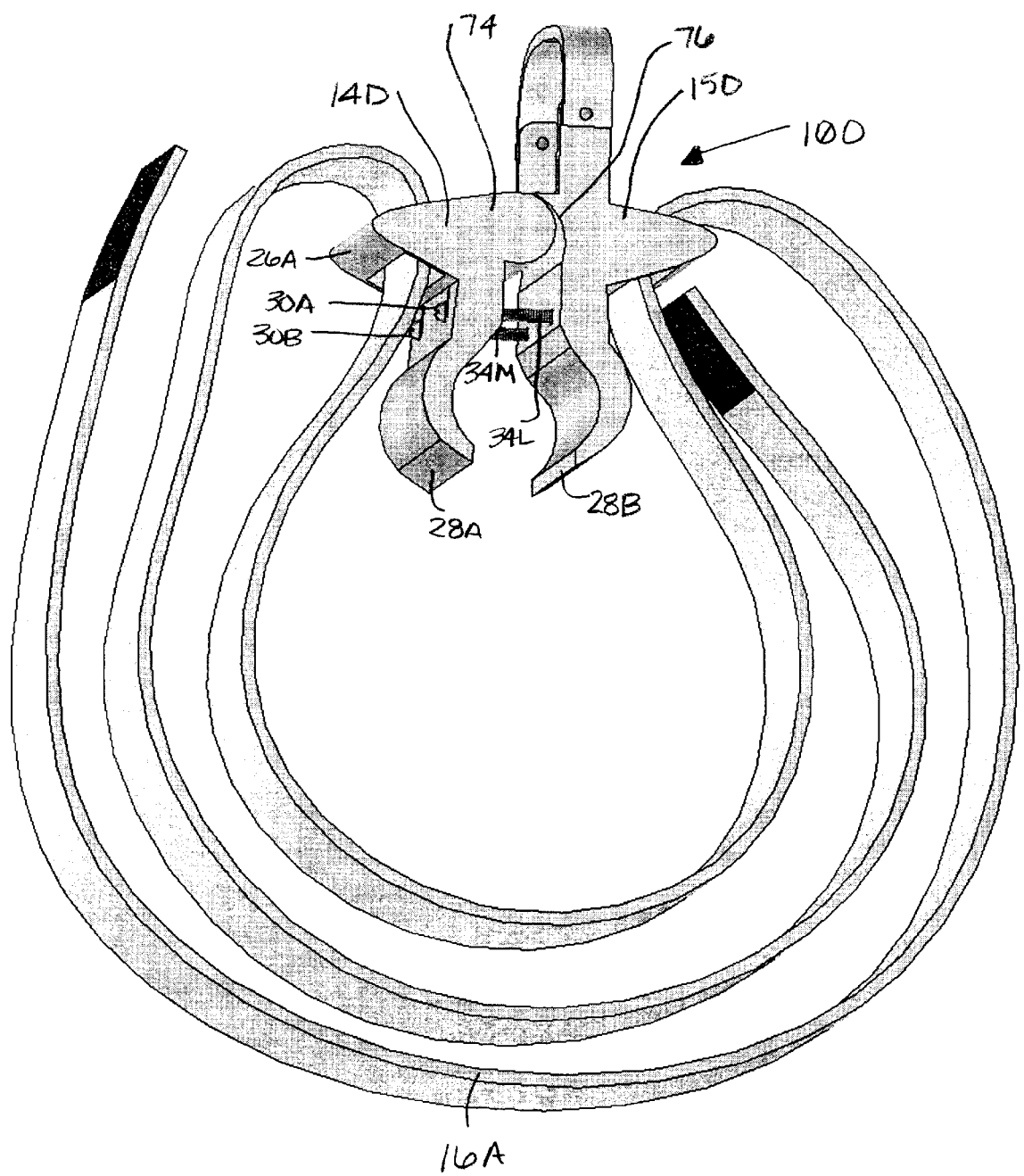

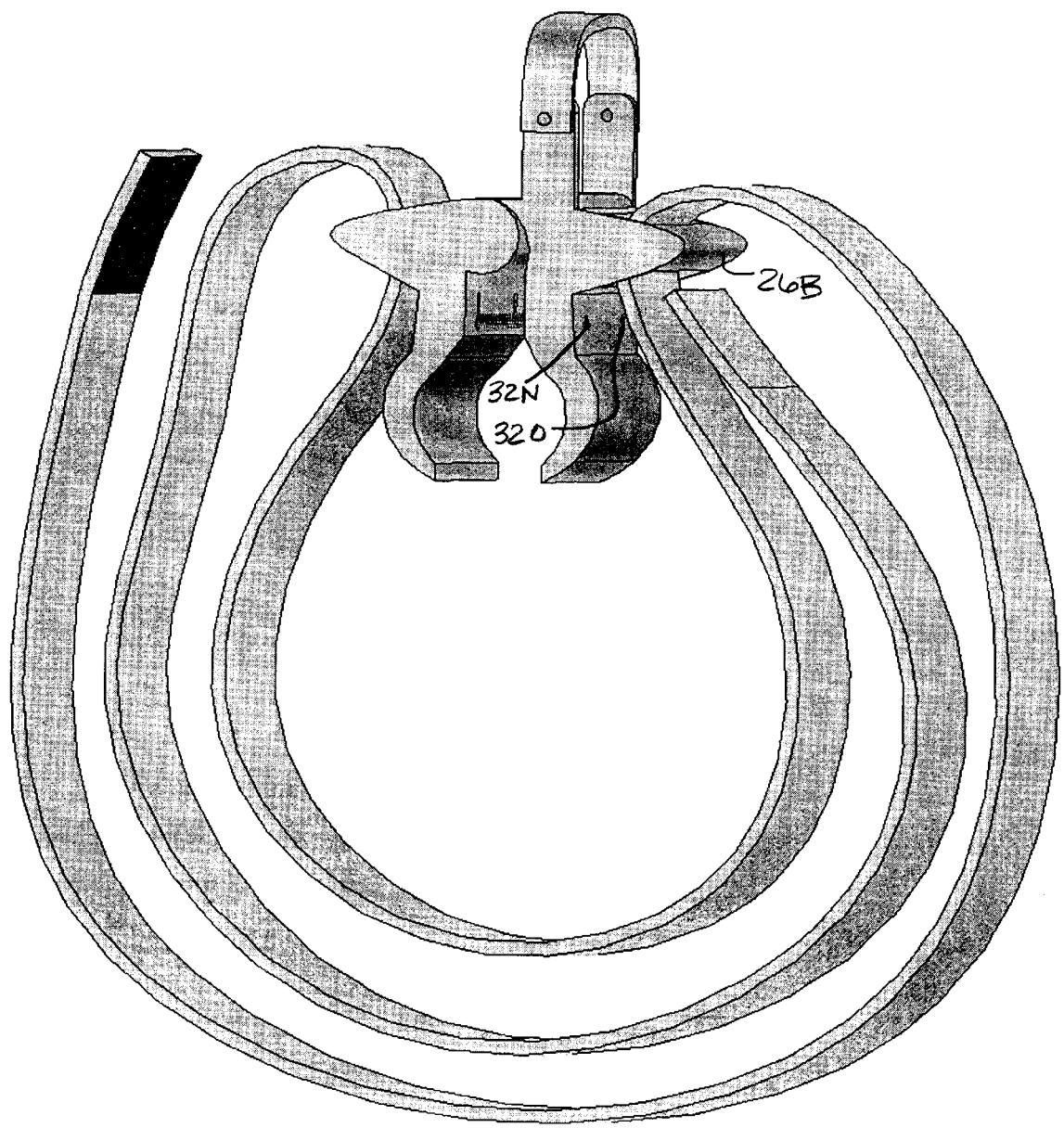
FIG 9.G.

BUNDLING DEVICE FOR A LENGTH OF LINE TYPE MATERIAL

CROSS-REFERENCE TO RELATED APPLICATIONS

This application is entitled to the benefit or Provisional Patent Application Ser. No. 60/218567, filed Jul. 16, 2000.

BACKGROUND—FIELD OF INVENTION

This invention relates to a bundling device that is comprising of a body that is designed to be firmly disposed to a segmented portion of line type material. Where bundling device is also comprising of a bundling strap designed to hold a personally sized coiled length of line type material such as an, electric extension cord, coaxial cable, tube, hose, rope, battery jumper cable, strap, or the like of, in a coiled arrangement to the bundling device.

BACKGROUND—DESCRIPTION OF PRIOR ART

Many line type materials such as cords, cables, ropes and the like of necessitate an orderly arrangement for both storage and safety purposes. The most common arrangement of these materials is in a coiled loop. Before a device was invented the solution was to wrap one end of the line around the coiled line, then tie up one end of the line to itself. As well as being difficult, unreliable, and time consuming this puts a strain on the end of the line set thus decreasing the life expectancy of a line. Early bundling devices consisted of a short length of string or rope to tie around a bundle of line to hold the line in an coiled loop, this bundled the line but did not separately hold a segmented portion of line and was therefor able to become lost easily. Many devices have been invented such as Bayat U.S. Pat. No. 4,442,984, Gruenewald U.S. Pat. No. 4,177,961, Knapp U.S. Pat. No. 6,003,803, Harrington U.S. Pat. No. 4,182,005. Although these type devices are novel and helpful in the process of arranging the line type material into a coiled loop. These devices have proven themselves inadequate for field use due to their bulky design and limited range of line type material in which they may hold. Some other less bulky inventions such as Kaplan U.S. Pat. No. 4,096,863, Kaplan U.S. Pat. No. 5,920,965 and Kaldor U.S. Pat. No. 5,745,958 were invented but still these devices were inadequate due to their limited range of line type material in which they may hold.

The need for a device that may be disposed to a segmented portion of a line type material with the ability to hold a wide range of bundled line type material has been known throughout the field since its conception. Inventions such as, Hasslinger U.S. Pat. No. 4,088,136, Hunt U.S. Pat. No. 5,075,932, Lyons U.S. Pat. No. 5,881,436, Hahn U.S. Pat. No. 5,142,743 Trethewey U.S. Pat. No. 5,548,871, Tolan U.S. Pat. No. 5,802,676, Denaro U.S. Pat. No. 5,031,282, and Reed U.S. Pat. No. 5,168,603 address the issue of disposing the device to a segmented portion of the line type material and incorporate a wide range of line type material in which they may hold, but they do not address the issue of firmly disposing the device to the line type material. Thus compromising the integrity of the device by the device being able to move laterally about the line type material. A device such as Fennell U.S. Pat. No. 4,700,432 addresses the issue of firmly disposing the device to the line type material but this device uses a tie that is difficult to release from the line type material therefor reducing the life of the tie and making it necessary to replace the tie from time to time. Therefore there is a need for a durable, compact, inexpensive and effective reusable bundling device. That has the ability to hold a wide range of personally sized coiled line type material and that also has the ability to be firmly disposed to a segmented portion of line type material so as to eliminate the device from moving laterally about the line type material.

SUMMARY OF THE INVENTION

An improved bundling device for a length of line type material. Comprising of a separate reusable body designed to firmly dispose the bundling device to a segmented portion of line type material, and a bundling strap harnessed by the body, designed to hold a personally sized length of coiled line type material to the body

Objects and Advantages

It is therefore one object of the present invention to provide an improved line type material bundling device for round line type materials.

It is another object of the present invention to provide an improved line type material bundling device for flat line type materials.

It is another object of the present invention to provide an improved electric extension cord bundling device.

It is yet another object of the present invention to provide an improved electric extension cord bundling device which will eliminate the need of tying up one end of the electric extension cord to the bundled electric extension cord therefor extending the life of the electric extension cord.

It is another object of the present invention to provide an improved line type material bundling device that may be firmly disposed to a segmented portion of line type material and may also then be released from a segmented portion of line type material.

It is yet another object of the present invention to provide an improved line type material bundling device that is inexpensively manufactured and assembled.

It is yet another object of the present invention to provide an improved line type material bundling device which is easily and quickly adjustable to different diameters of coiled line type material.

It is yet another object of the present invention to provide an improved line type material bundling device that is compact, durable, and effective for ideal use in the field.

It is yet another object of the present invention to provide a method for firmly disposing a bundling device to a segmented portion of line type material and hold a personally sized coiled length of line type material inan coiled arrangement.

Further objects and advantages of my invention will become apparent from a consideration of the drawings and ensuing description.

DRAWING FIGURES

FIG. 1A is a forward perspective view of the bundling device with a body 10A encircling a segmented portion of line type material and a bundling strap 16A in position one holding a coiled length of line type material.

FIG. 1B is an alternate sided forward perspective view of the bundling device with a body 10A encircling a segmented portion of line type material and a bundling strap 16A in position one holding a coiled length of line type material.

FIG. 1C is a cross sectional aft view of the bundling device with a body 10A encircling a segmented portion of line type material and a bundling strap 16A in position one holding a coiled length of line type material.

FIG. 2A is an alternate sided forward perspective view of the bundling device with a body 10B and a bundling strap 16B.

FIG. 3A is an alternate sided forward perspective view of the bundling device with a body 10B and a bundling strap 16B in a position two.

FIGS. 4 and 4A is a forward perspective view of the bundling device with a body 10C and a bundling strap 16C separated from body 10C.

FIG. 4B is an alternate sided forward perspective view of the bundling device with a body 10C and a bundling strap 16C disposed to body 10C.

FIG. 4C is a forward perspective view of the bundling device with a body 10D and a bundling strap 16C in a position two.

FIG. 4C is an alternate sided forward perspective view of the bundling device with a body 10D and a bundling strap 16C in a position two.

FIG. 5A is an alternate sided forward perspective view of the bundling device with a body 10E and a bundling strap 16A in a position two.

FIG. 5C is a forward perspective view of the bundling device with a body 10F and a bundling strap 16A in a position three.

FIG. 5D is an alternate sided forward perspective view of the bundling device with a body 10F and a bundling strap 16A in a position three.

FIG. 5E is a forward perspective view of the bundling device with a body 10G and a bundling strap 16D.

FIG. 5F is an alternate sided forward perspective view of the bundling device with a body 10G and a bundling strap 16D.

FIG. 6A is an alternate sided forward perspective view of the bundling device with a body 10H and a bundling strap 16A shown here upside down in a position four.

FIG. 6B is a forward perspective view of the bundling device with a body 10I and a bundling strap 16C.

FIG. 6C, is an alternate sided aft perspective view of the bundling device with a body 10I and a bundling strap 16C.

FIG. 7 is a forward perspective view of the bundling device with a body 10J and a bundling strap 16A in a position five.

FIG. 8 is a forward perspective view of the bundling device with a body 10K and a bundling strap 16B.

FIG. 8A is an alternate sided forward perspective view of the bundling device with a body 10K and a bundling strap 16B.

FIG. 9A is an alternate sided forward perspective view of the bundling device with a body 10L and a bundling strap 16E.

FIG. 9B is a forward perspective view of the bundling device with a body 10M and a bundling strap 16A in a position one.

FIG. 9C is an alternate sided forward perspective view of the bundling device with a body 10M and a bundling strap 16A in a position one.

FIG. 9D is a forward perspective view of the bundling device with a body 10N and a bundling strap 16A in a position six.

FIG. 9E is an alternate sided forward perspective view of the bundling device with a body 10N and a bundling strap 16A in a position six.

FIG. 9F is a forward perspective view of the bundling device with a body 10O and a bundling strap 16A in a position seven.

FIG. 9G is an alternate sided forward perspective view of the bundling device with a body 10O and a bundling strap 16A in a position seven.

Reference Numerals In Drawings

10A–10O. Body
11A–11D. Body Portion One
12 A–12D. Body Portion Two
13 A–13C. Bending Point
14 A–14D. Body Piece One
15 A–15D. Body Piece Two
16 A–16E. Bundling Strap
17A. Bundling Strap Surface One
17B. Bundling Strap Surface Two
18A–G. Bundling Strap First End Portion
18B. Bundling Strap Second End Portion
18C. Bundling Strap Center Portion
19. Loop Fastening Material
20. Hook Fastening Material
21A–21C. Mounting Bracket
22A. Hanger Strap
22B. Hanger Strap
23A. Hanger Strap End One
23B. Hanger Strap End Two
24A–24E. Securing Pin
25. Bar Slot
26A–26C. Immured Single Bar
27A. Bar Portion One
27B. Bar Portion Two
28A. Arm
28B. Arm
28C. Arm
28D. Arm
30A–30E. Elongated Hole
32A–32O. Threaded Hole
34A–34M. Screw
35A. Thumb Screw
35B. Thumb Screw
36. Screw Threads
38. Screw Body
39. Screw Head
40A. Recessed Area Inside Surface One 40B. Recessed Area Inside Surface One
41A. Recessed Area Inside Surface Two
41B. Recessed Area Inside Surface Two
42A–42D. Recessed Area
43A–43D. Tooth
44A. Ridge
44B. Ridge
45A. Rise
45B. Rise
46 Stitch
48. Handle
50. Reinforcement Bar
54A–C. Adhesive Backed Hook Fastening Material
56. Strip of Loop Fastening Material
58. Hanger Strap Mounting Bracket
62A–62J. Screw Hole
64A–64B. Row of Teeth
72. Strap Guide
74. Elongated Convex Engaging Point
76. Elongated Concave Engaging Point
78. Glue
80A. Body Front
80B. Body Front
82A. Body Portion One Outer Surface
82B. Body Portion Two Outer Surface
83 Outside Surface
84A. Body Top
84B. Body Bottom
86. Segmented Portion Of Line Type Material
87. Inside Surface
88. Line Type Material
90. Strap Hole
92. Strap Hole Inside Opening
94. Strap Hole Outside Opening
96. Bundling Strap Pass Through
98A. Body Side One
98B. Body Side Two
100A–100D. Vertical Ridge
102. Line Hole
105. Elongated Tooth

Figure 1:
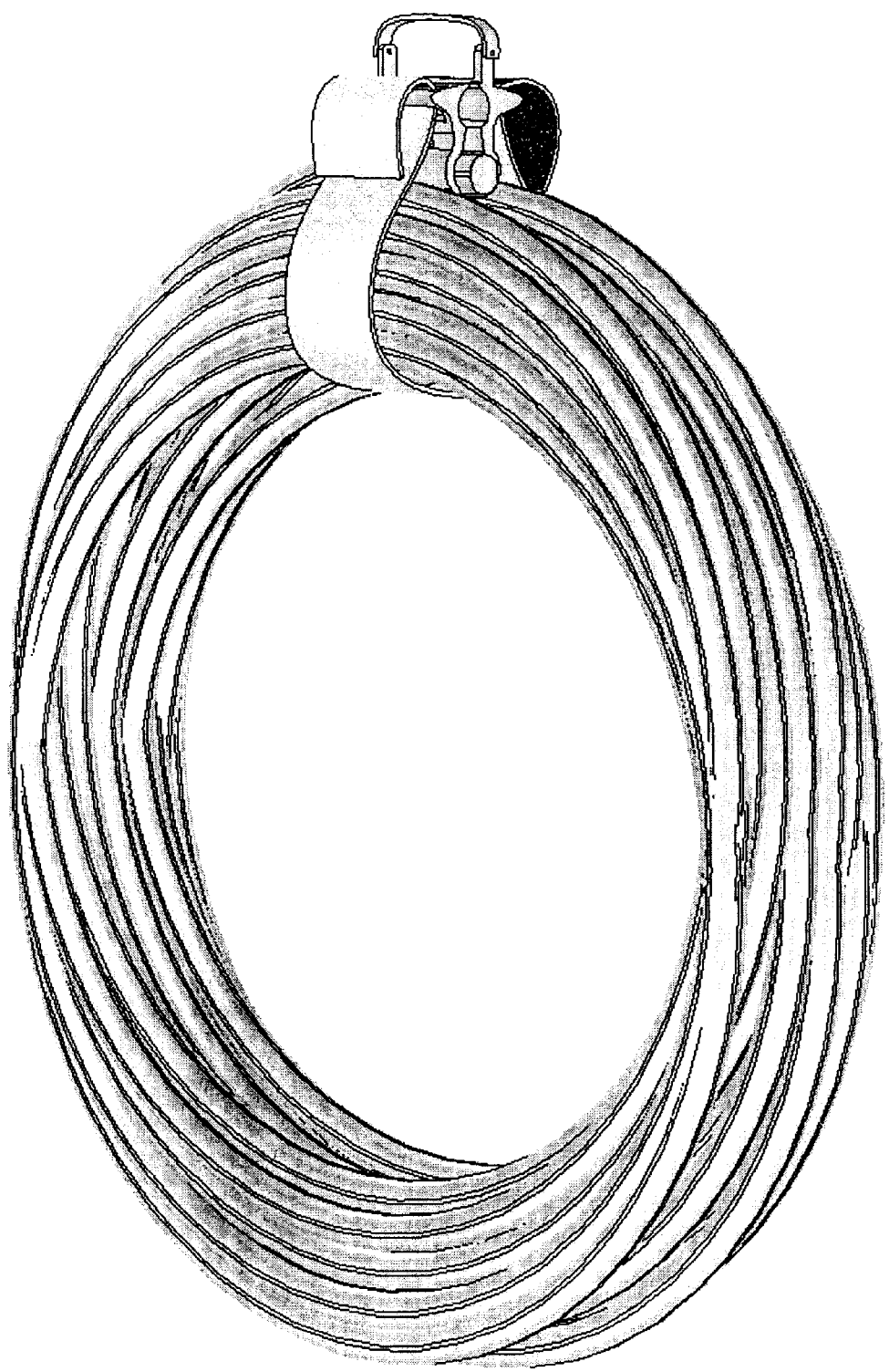
FIG. 1 is a forward perspective view of the bundling device with a body 10A disposed to a segmented portion of line type material and a bundling strap 16A in position one holding a coiled length of line type material.

DESCRIPTION—FIGS. 1A, 1B and 1C—Preferred Embodiment

A preferred embodiment of the bundling device of the present invention is illustrated in FIGS. 1A, 1B, and 1C. The bundling device has a body 10A that is formed with a plastic material by using a process called injector molding. Body 10A is formed with a body portion one 11A and a body portion two 12A that are joined together at a bending point 13A. Bending point 13A is disposed at the top of body 10A.

Body 10A is formed with a mounting bracket 21A and a mounting bracket 21B formed on top of body portion two 12A. Mounting bracket 21A and mounting bracket 21B and a hanger strap 22A are disposed above body 10A so as to create a bundling strap pass through 96 for a bundling strap 16A. The width of bundling strap pass through 96 is greater than the width of bundling strap 16A. The height of bundling strap pass through 96 is greater than the height of bundling strap 16A. Hanger strap 22A is comprised of a flexible nylon fabric material. A hanger strap end one 23A is mounted to mounting bracket 21A by a securing pin 24A and a hanger strap end two 23B is mounted to mounting bracket 21B by securing pin 24B.

Body portion one 1A is formed with a horizontally disposed immured single bar 26A, and body portion two 12A is formed with a horizontally disposed immured single bar 26B. The distance between immured single bar 26A and body portion one 11A is greater than the thickness of bundling strap 16A. The distance between immured single bar 26B and body portion two 12A is greater than the thickness of bundling strap 16A. The length of immured single bar 26A and the length of immured single bar 26B is usually greater than the width of bundling strap 16A. Immured single bar 26A, and immured single bar 26B are usually placed on the top portion of body 10A. Body portion one 11A is formed with an arm 28A and body portion two 12A is formed with an arm 28B. Arm 28A is disposed below body portion 11A. Arm 28B is disposed below body portion 12A. Arm 28A and 28B are formed so as to receive a segmented portion of line type material 86. Body 10A is comprising of a screw 34A and a screw 34B disposed horizontally through body portion one 11A and body portion two 12A. Body portion one 11A comprises of an elongated hole 30A and an elongated hole 30B. Elongated holes 30A and 30B are large enough to provide access for a screw body 38 and are small enough to limit entry of a screw head 39. Body portion two 12A is comprising of a threaded hole 32A and a threaded hole 32B (FIG. 1B). Where threaded holes 32A and 32B are disposed directly across from elongated holes 30A and 30B respectively.

Hook fastening material and loop fastening material, commercially available under the trademark VELCRO, is a fabric-like material, which consists of two parts, a "loop fastening material" which adheres to a "hook fastening material". The parts will pull apart with some effort and re-adhere whenever the two different parts are pressed together.

Bundling strap 16A, shown here in position one, is constructed with a combination of both two parts of VEL-CRO material that are permanently attached to each other by glue or stitching. Two opposite facing surfaces together form a bundling strap surface one 17A and a bundling strap surface two 17B. Bundling strap 16A is sectioned into three portions, a bundling strap first end portion 18A, a bundling strap second end portion 18B, and a bundling strap center portion 18C that are permanently assembled together by glue or stitching. Bundling strap first end portion 18A is comprising of a loop fastening material 19 on bundling strap surface one 17A and a hook fastening material 20 on bundling strap surface two 17B. Bundling strap second end portion 18B comprises of hook fastening material 20 on both bundling strap surfaces 17A and 17B. Bundling strap center portion 18C comprises of loop fastening material 19 on both bundling strap surfaces 17A and 17B. Center portion 18C may be of various lengths and widths depending on the application of the bundling device. Center portion 18C is usually the longest portion. First end portion 18A and second end portion 18B may be of various lengths and widths but are usually shorter than center portion 18C and are also usually the same width as center portion 18C.

The length of body 10A is referred to as the distance from a body front 80A to a body front 80B. Body 10A may be of various lengths, but is generally designed so that the length of the body 10A is longer than the width of bundling strap 16A. The width of body 10A is referred to as the distance from a body portion one outside surface 82A to a body portion two outside surface 82B. Body 10A may be of various widths, but is generally designed so that the width of body 10A is wider than the width of the line type material 88. The height of body 10A is referred to as the distance from a body top 84A to a body bottom 84B. Body 10A may be of various heights, but is generally designed so that the height of body 10A is longer than the height of the line type material 88.

OPERATION—FIG. 1A—Preferred Embodiment

Operationally, first body 10A is firmly disposed to segmented portion of line type material 86 by placing segmented portion of line type material 86 between arms 28A and 28B. Then tighten screws 34A and 34B which will compress bending point 13A and shorten the width of body 10A and firmly dispose body 10A to segmented portion of line type material 86. First fold bundling strap first end portion 18A backwards around immured single bar 26A towards itself and adhere hook fastening material 20 of bundling strap first end portion 18A to loop fastening material 19 of bundling strap center portion 18C. Bundling strap center portion 18C is then wrapped around a section of coiled line type material 88. Fold bundling strap second end portion 18B backwards around immured single bar 26B towards itself and adhere hook fastening material 20 of bundling strap second end portion 18B to loop fastening material 19 of bundling strap 16A.

FIGS. 2–9—Alternative Embodiments

Figure 2:
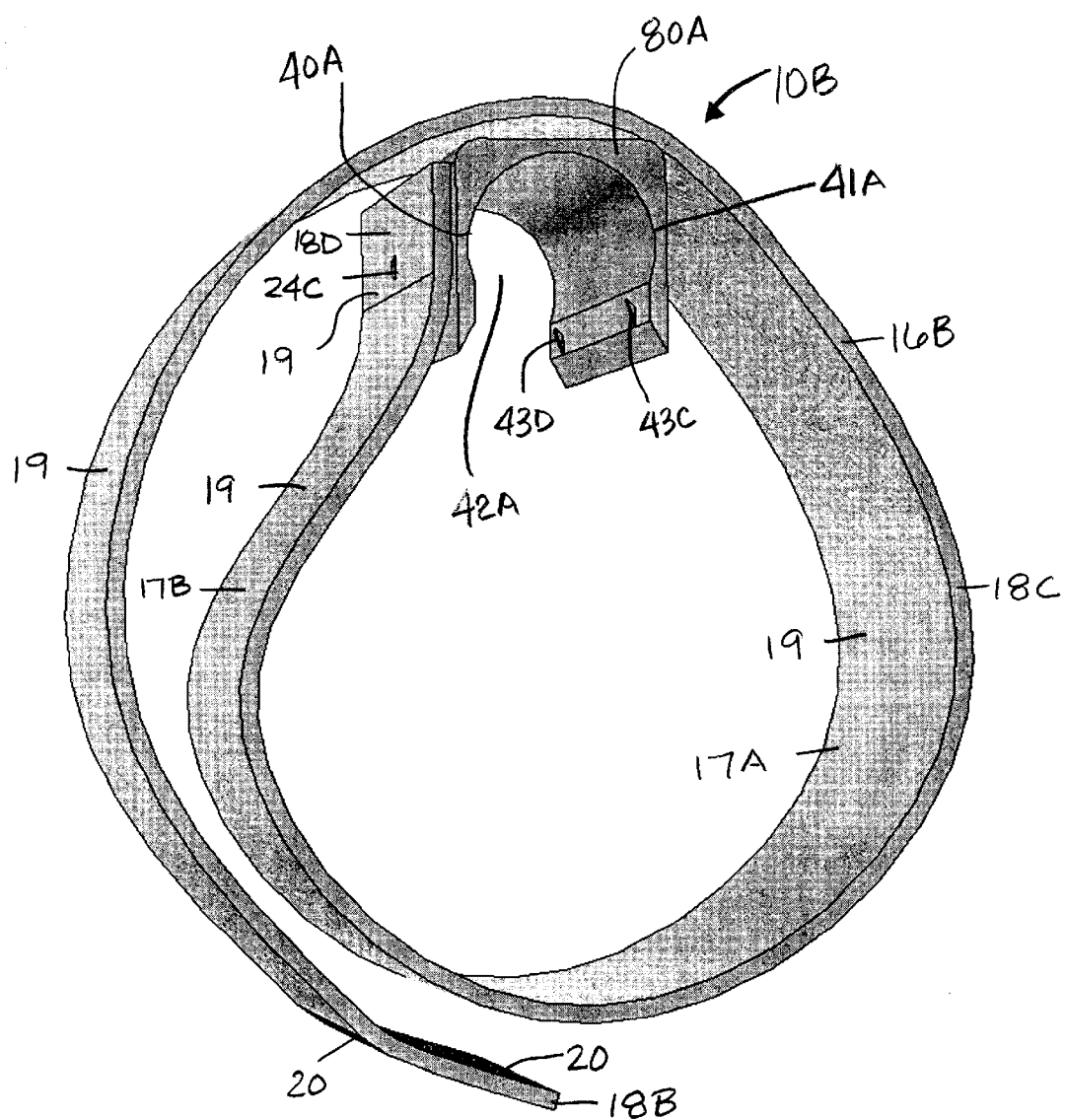
FIG. 2 is a forward perspective view of the bundling device with a body 10B and a bundling strap 16B.

There are various possibilities with regard to the different sizes and shapes of body 10A so that it may be firmly disposed to a segmented portion of line type material 86. There are also various possibilities with regard to the different positions that bundling strap 16A may attain in which to hold a personally sized coiled length of line type material to the body 10A, as illustrated in FIG. 2 through FIG. 9, which presents perspective views. FIGS. 2 and 2A shows a body 10B that is formed with a plastic material by using a process called injector molding. Body 10B formed with a recessed area 42A designed to receive segmented portion of line type material 86. Recessed area 42A is disposed horizontally through body 10B from body front 80A to body front 80B. The width of recessed area 42A is referred to as the widest distance from a recessed area inside surface one 40A to a recessed area inside surface two 41A. The width of recessed area 42A is usually shorter than the width of the segmented portion of line type material 86. Recessed area inside surface one 40A is formed with a tooth 43A, and a tooth 43B pointing towards the inside of recessed area 42A. Recessed area inside surface two 41A is formed with a tooth 43C, and a tooth 43D pointing towards the inside of recessed area 42A. A bundling strap 16B, shown here in position one, is constructed with a combination of both two parts of VELCRO material that are permanently attached to each other by glue or stitching. Two opposite facing surfaces together form a bundling strap surface one 17A and a bundling strap surface two 17B. Bundling strap 16B is sectioned into three portions, a bundling strap first end portion 18D, a bundling strap second end portion 18B, and a bundling strap center portion 18C that are permanently assembled together by glue or stitching. Bundling strap first end portion 18D is comprising of loop fastening material 19 on bundling strap surface two 17B. Bundling strap second end portion 18B is comprising of hook fastening material 20 on both bundling strap surfaces 17A and 17B. Bundling strap center portion 18C is comprising of loop fastening material 19 on both bundling strap surfaces 17A and 17B. Bundling strap first end portion 18D is disposed to body 10B by a securing pin 24C.

Operationally body 10B is firmly disposed to segmented portion of line type material 86 by placing segmented portion of line type material 86 inside recessed area 42A and when doing so teeth 43A, through 43D hold segmented portion of line type material 86 from easily releasing from recessed area 42A. Bundling strap first end portion 18D is disposed to body 10B by securing pin 24C through bundling strap first end portion 18A and body 10B. Bundling strap center portion 18C may then be wrapped around a section of coiled line type material 88 and then around body 10B so that hook fastening material 20 of bundling strap second end portion 18B may be adhered to loop fastening material 19 of bundling strap 16B.

Figure 3:
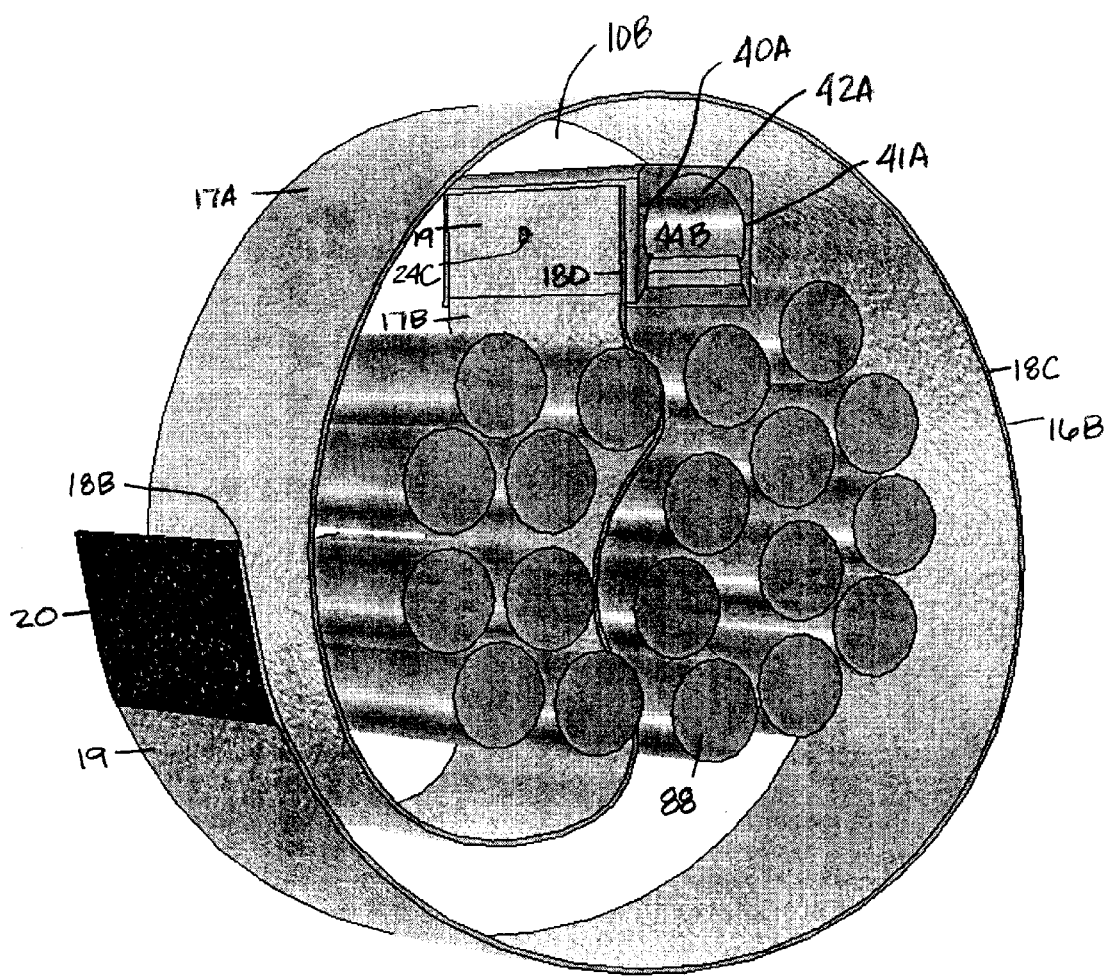
FIG. 3 is a forward perspective view of the bundling device with a body 10B and a bundling strap 16B in a position two.

FIGS. 3 and 3A shows a body 10B formed with a recessed area 42A. Recessed area inside surface one 40A is formed with a ridge 44A pointing towards the inside of recessed area 42A. Recessed area inside surface two 41A is formed with a ridge 44B pointing towards the inside of recessed area 42A. A bundling strap 16B is shown here in position two. Bundling strap first end portion 18D is comprising of loop fastening material 19 on bundling strap surface two 17B. Bundling strap second end portion 18B is comprising of hook fastening material 20 on both bundling strap surfaces 17A and 17B. Bundling strap center portion 18C is comprising of loop fastening material 19 on both bundling strap surfaces 17A and 17B. Bundling strap first end portion 18D is disposed to body 10B by securing pin 24C through first end portion 18A and body 10B.

Operationally body 10B is firmly disposed to segmented portion of line type material 86 by placing segmented portion of line type material 86 inside recessed area 42A, when doing so ridge 44A and ridge 44B hold segmented portion of line type material 86 from easily releasing from recessed area 42A. Bundling strap center portion 18C is, shown here, caught in between a section of line type material 88 and wrapped in a second direction around a section of coiled line type material 88. Bundling strap center portion 18C is then wrapped around body 10B and then around the remaining unwrapped section of coiled line type material 88 so that hook fastening material 20 of bundling strap second end portion 18B may be adhered to loop fastening material 19 of bundling strap 16B.

FIGS. 4, 4A and 4B shows a body 10C that is formed with a plastic material by using a process called injector molding. Body 10C formed with a strap hole 90 placed through one section of body 10C. Strap hole 90 is comprising of a strap hole inside opening 92 and a strap hole outside opening 94. Body 10C is formed with a bar slot 25 that begins at strap hole inside opening 92 and ends at recessed area 42A. The width of recessed area 42B is referred to as the widest distance from a recessed area inside surface one 40A to a recessed area inside surface two 41A. The width of recessed area 42A is shorter than the width of the segmented portion of line type material 86. A bundling strap 16C, shown here separate from body 10C in position one, is constructed with a combination of both two parts of VELCRO material that are permanently attached to each other by glue or stitching. Two opposite facing surfaces together form a bundling strap surface one 17A and a bundling strap surface two 17B. Bundling strap 16C is sectioned into three portions, a bundling strap first end portion 18E, a bundling strap second end portion 18B, and a bundling strap center portion 18C that are permanently assembled together by glue or stitching. Bundling strap end portion one 18E is disposed between a bar section one 27A and a bar section two 27B. Bar section one 27A and bar section two 27B are mounted to bundling strap end portion one 18E by a securing pin 24D and a securing pin 24E that are disposed through bar section one 27A, bundling strap end portion one 18E and bar section two 27B. The width of strap hole 90 is less than the width of bar section one 27A and bar section two 27B. The height of strap hole 90 is less than the height of bar section one 27A and bar section two 27B when assembled to bundling strap end portion one 18E. A bundling strap 16C is shown here in position one. Bundling strap second end portion 18B is comprising of hook fastening material 20 on both bundling strap surfaces 17A and 17B. Bundling strap center portion 18C is comprising of loop fastening material 19 on both bundling strap surfaces 17A and 17B.

Operationally bundling strap end portion two 18B is inserted through strap hole 90 from a strap hole inside opening 92 towards strap outer hole opening 94. Bundling strap end portion two 18B is then pulled completely through strap hole 90 until bundling strap end portion one 18E, bar section one 27A and bar section two 27B are all fitted into bar slot 25. Body 10C is disposed to segmented portion of line type material 86 by placing segmented portion of line type material 86 inside recessed area 42A and when doing so recessed area 42A holds segmented portion of line type material 86 from easily releasing from body 10C. A bundling strap 16C is shown here in position one. Bundling strap center portion 18C is wrapped around a section of coiled line type material 88 and then around body 10C so that hook fastening material 20 of bundling strap second end portion 18B may be adhered to loop fastening material 19 of bundling strap 16C.

FIGS. 4C and 4D shows a body 10D that is formed with a plastic material by using a process called injector molding. Body 10D formed with a strap hole 90 placed through one section of body 10D. Strap hole 90 is comprising of a strap hole inside opening 92 and a strap hole outside opening 94. Body 10D is formed with a bar slot 25 that begins at strap hole inside opening 92 and ends at recessed area 42B that is formed with a recessed area 42B designed to receive segmented portion of line type material 86. Recessed area 42B is disposed-horizontally through body 10D from body front 80A to body front 80B. The width of recessed area 42B is referred to as the widest distance from a recessed area inside surface one 40B to a recessed area inside surface two 41B. The width of recessed area 42B is usually shorter than the width of the segmented portion of line type material 86. Recessed area inside surface one 40B is formed with a vertical ridge 100A and a vertical ridge 100B pointing towards the inside of recessed area 42B. Recessed area inside surface two 41B is formed with a vertical ridge 100C and a vertical ridge 100D pointing towards the inside of recessed area 42B. A bundling strap 16C is shown here in a second position.

Operationally bundling strap end portion two 18B is inserted through strap hole 90 from a strap hole inside opening 92 towards strap outer hole opening 94. Bundling strap end portion two 18B is then pulled completely through strap hole 90 until bundling strap end portion one 18E, bar section one 27A and bar section two 27B are all fitted into bar slot 25. Body 10D is disposed to segmented portion of line type material 86 by placing segmented portion of line type material 86 inside recessed area 42B and when doing so vertical ridge 10A, through 100D hold segmented portion of line type material 86 from easily releasing from recessed area 42B. A bundling strap 16C is shown here in a second position. Whereby bundling strap center portion 18C is wrapped around body 10C and then around a section of coiled line type material 88 so that hook fastening material 20 of bundling strap second end portion 18B may be adhered to loop fastening material 19 of bundling strap 16C.

Figure 5:
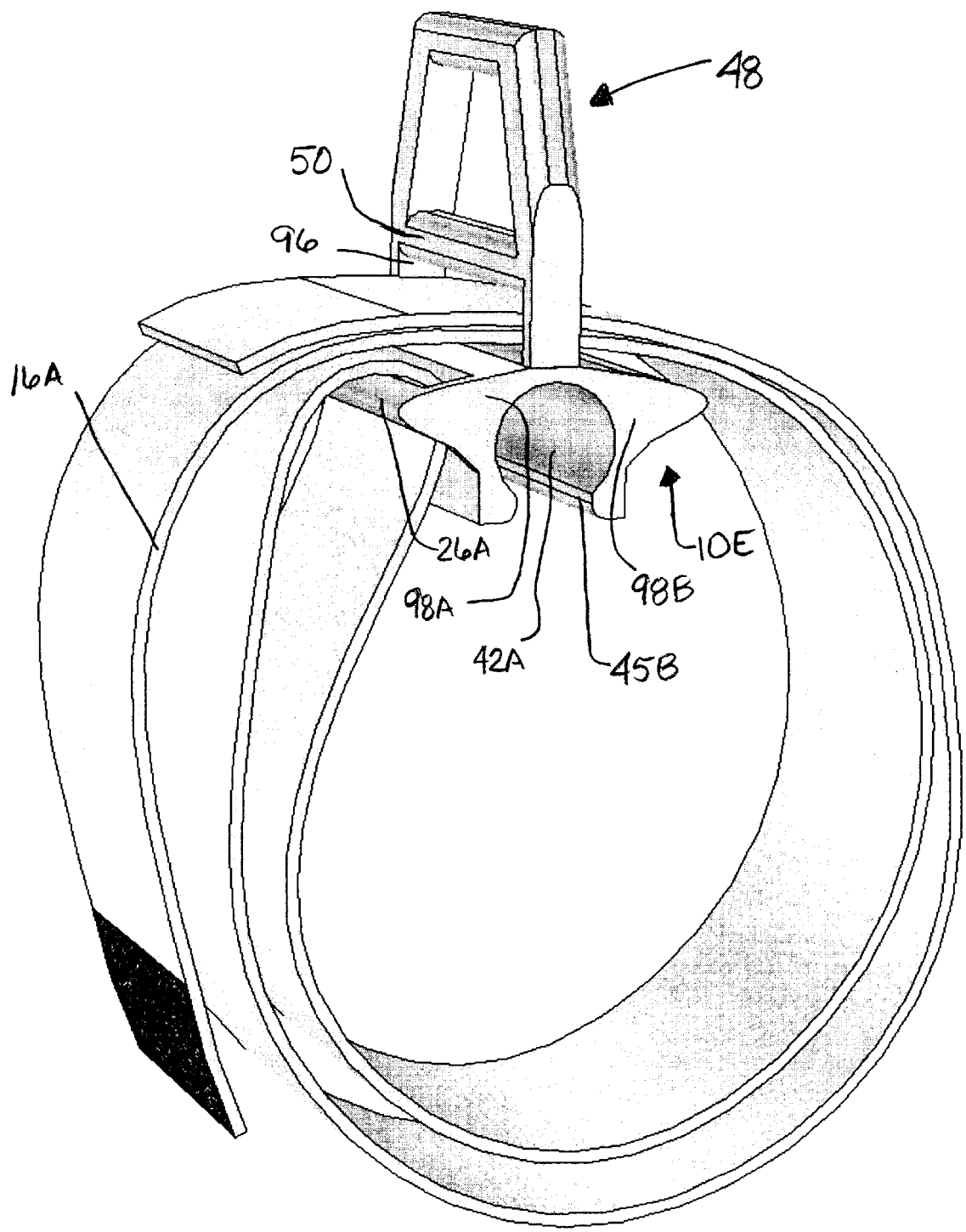
FIG. 5 is a forward perspective view of the bundling device with a body 10E and a bundling strap 16A in a position two.

FIGS. 5 and 5A shows a body 10E that is formed with a plastic material by using a process called injector molding. Body 10E formed with handle 48 disposed above body 10E. Handle 48 formed with horizontally disposed reinforcement bar 50. Reinforcement bar 50 is disposed to handle 48 above body 10E so as to create a bundling strap pass through 96 for bundling strap 16A. The width of bundling strap pass through 96 is greater than the width of bundling strap 16A. The height of bundling strap pass through 96 is greater than the height of bundling strap 16A. Body side one 98A is formed with a horizontally disposed immured single bar 26A, and body side two 98B is formed with a horizontally disposed immured single bar 26B. Body 10E formed with a recessed area 42A designed to receive segmented portion of line type material 86. Recessed area 42A is disposed horizontally through body 10E from body front 80A to body front 80B. Recessed area inside surface one 40A is formed with a rise 45A pointing towards the inside of recessed area 42A. Recessed area inside surface two 41A is formed with a ridge 45B pointing towards the inside of recessed area 42A. Bundling strap 16A is shown here in position two.

Operationally body 10E is firmly disposed to segmented portion of line type material 86 by placing segmented portion of line type material 86 inside recessed area 42A, when doing so rise 45A and rise 45B hold segmented portion of line type material 86 from easily releasing from recessed area 42A. Bundling strap center portion 18C is wrapped around a section of coiled line type material 88. Bundling strap second end portion 18B is then inserted through a bundling strap pass through 96 so that hook fastening material 20 of bundling strap second end portion 18B may be adhered to loop fastening material 19 of bundling strap 16A.

FIGS. 5C and 5D shows a body 10F that is formed with a plastic material by using a process called injector molding. Body 10F formed with handle 48 disposed above body 10F. Handle 48 formed with horizontally disposed reinforcement bar 50. Reinforcement bar 50 is disposed to handle 48 above body 10F so as to create a bundling strap pass through 96 for bundling strap 16A. The width of bundling strap pass through 96 is greater than the width of bundling strap 16A. The height of bundling strap pass through 96 is greater than the height of bundling strap 16A. Body side one 98A is formed with a horizontally disposed immured single bar 26A, and body side two 98B is formed with a horizontally disposed immured single bar 26B. Body 10F formed with a recessed area 42A designed to receive segmented portion of line type material 86. Recessed area 42A is disposed horizontally through body 10F from body front 80A to body front 80B. A strip of adhesive backed hook fastening material 54A is disposed to the lower portion of body side one 98A beside recessed area 42A with hook fastening material 20 facing out. A strip of adhesive backed hook fastening material 54B is disposed to the lower portion of body side two 98B beside recessed area 42A with hook fastening material 20 facing out. A strip of loop fastening material 56 is disposed to body 10F so as to cover opening of recessed area 42A. Strip of loop fastening material 56 is comprised of one surface of loop fastening 19. Loop fastening material 19 of strip of loop fastening material 56 is adhered to hook fastening material 20 of both strip of adhesive backed hook fastening material 54A and strip of adhesive backed hook fastening material 54B. Bundling strap 16A is shown here in position three.

Operationally body 10F is firmly disposed to segmented portion of line type material 86 by placing segmented portion of line type material 86 inside recessed area 42A. The strip of loop fastening material 56 is then placed over recessed area 42A so to hold segmented portion of line type material 86 from easily releasing from recessed area 42A. Loop fastening material 19 of strip of loop fastening material 56 is then adhered to hook fastening material 20 of both strips of adhesive backed hook fastening material 54A and strip of adhesive backed hook fastening material 54B. Bundling strap center portion 18C is wrapped around a section of coiled line type material 88. Bundling strap second end portion 18B is then inserted through a bundling strap pass through 96 so that hook fastening material 20 of bundling strap second end portion 18B may be adhered to loop fastening material 19 of bundling strap 16A.

FIGS. 5E and 5F shows a body 10G that is formed with a plastic material by using a process called injector molding. Body 10G formed with a body portion one 11B and a body portion two 12B that are joined together at a bending point 13B. Bending point 13B is disposed at the top of body 10G. Body 10G is formed with a mounting bracket 21C formed on top of body portion one 11B. A hanger strap 22B is comprised of a flexible nylon fabric material. Hanger strap end one 23A and hanger strap end two 23B are mounted to mounting bracket 21C by securing pin 24A. Body 10G formed with a recessed area 42A designed to receive segmented portion of line type material 86. Body portion two 12B is formed with a horizontally disposed immured single bar 26B. Recessed area 42A is disposed horizontally through body 10G from body front 80A to body front 80B. A strip of adhesive backed hook fastening material 54C is disposed to the top of body portion one 11B with hook fastening material 20 facing out. A strip of adhesive backed hook fastening material 54A is disposed to the lower portion of body portion one 11B beside recessed area 42A with hook fastening material 20 facing out. A strip of adhesive backed hook fastening material 54B is disposed to the lower portion of body portion two 12B beside recessed area 42A with hook fastening material 20 facing out. A bundling strap 16D is shown here. A bundling strap 16D is constructed with a combination of both two parts of VELCRO material that are permanently attached to each other by glue or stitching. Two opposite facing surfaces together form a bundling strap surface one 17A and a bundling strap surface two 17B. A strip of loop fastening material 56 is disposed to body 10G so as to cover opening of recessed area 42A. Strip of loop fastening material 56 is comprised of one surface of loop fastening 19. Loop fastening material 19 of strip of loop fastening material 56 is adhered to hook fastening material 20 of both strip of adhesive backed hook fastening material 54A and strip of adhesive backed hook fastening material 54B. Bundling strap 16D is sectioned into three portions, a bundling strap first end portion 18F, a bundling strap second end portion 18B, and a bundling strap center portion 18C that are permanently assembled together by glue or stitching. Bundling strap first end portion 18F is comprising of loop fastening material 19 on both bundling strap surfaces 17A and 17B. Bundling strap second end portion 18B is comprising of hook fastening material 20 on both bundling strap surfaces 17A and 17B. Bundling strap center portion 18C is comprising of loop fastening material 19 on both bundling strap surfaces 17A and 17B.

Operationally body 10G that is firmly disposed to segmented portion of line type material 86 by placing segmented portion of line type material 86 inside recessed area 42A. Then by squeezing together body portion one 11B and body portion two 12B which will compress bending point 13B and shorten the width of body 10G. The strip of loop fastening material 56 is then placed over recessed area 42A so to hold segmented portion of line type material 86 from easily releasing from recessed area 42A. Loop fastening material 19 of strip of loop fastening material 56 is then adhered to hook fastening material 20 of both strips of adhesive backed hook fastening material 54A and 54B. A bundling strap 16D is shown here. Loop fastening material 19 of bundling strap first end portion 18A is adhered to hook fastening material 20 of strip of adhesive backed hook fastening material 54C. Then bundling strap center portion 18C is wrapped around a section of coiled line type material 88. Then fold bundling strap second end portion 18B backwards around immured single bar 26B towards itself and adhere hook fastening material 20 of bundling strap second end portion 18B to loop fastening material 19 of bundling strap 16D.

Figure 6:
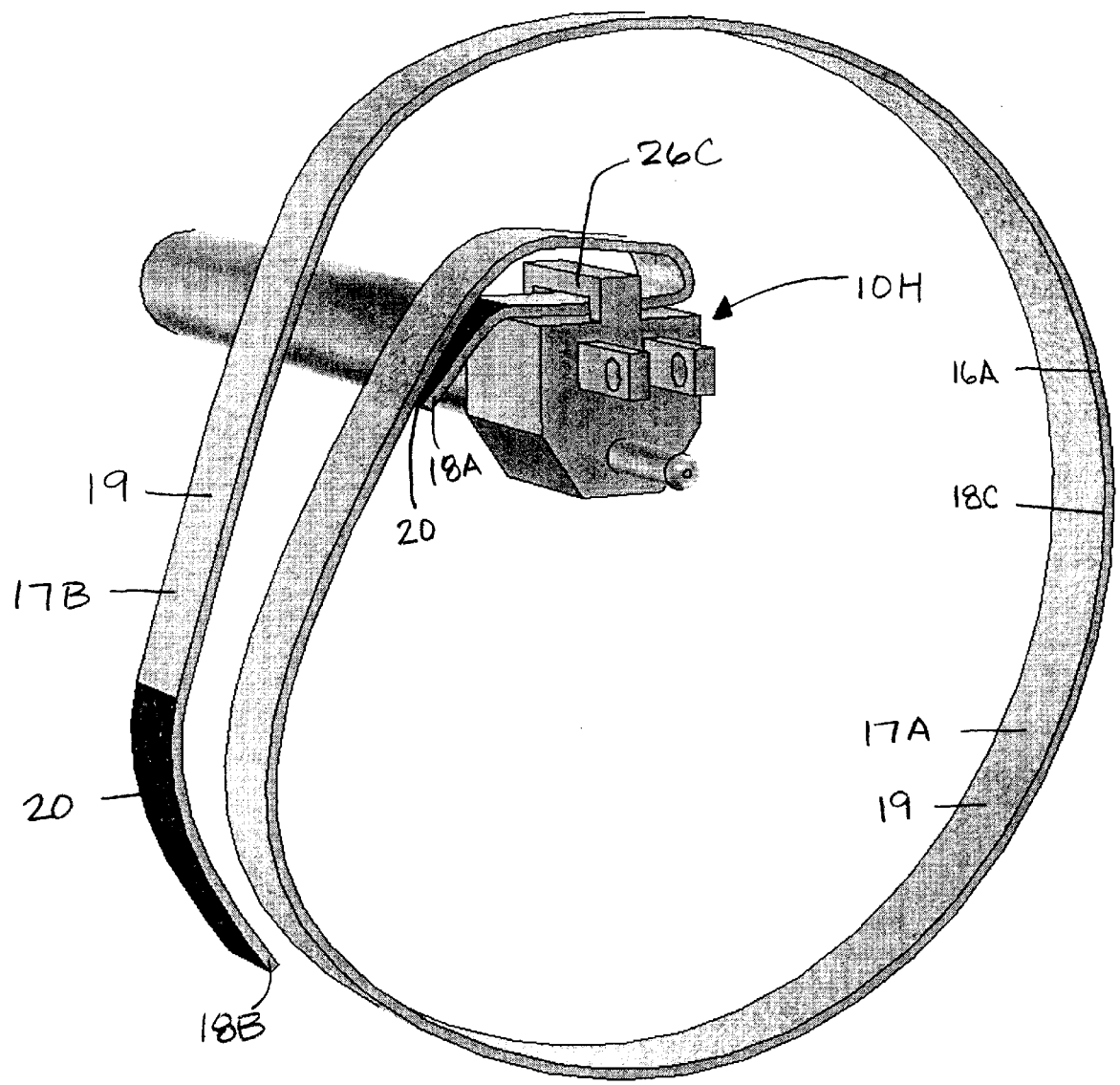
FIG. 6 is a forward perspective view of the bundling device with a body 10H and a bundling strap 16A shown here upside down in a position four.

FIGS. 6 and 6A shows a body 10H is formed of an electrical plug. Body 10H is formed with one immured single bar 26C disposed on top of body 10H. Bundling strap 16A is shown here upside down in position four.

Operationally body 10H is firmly disposed to segmented portion of line type material 86 by conventional methods that are used in attaching an electrical plug to an electrical cord. First fold bundling strap first end portion 18A forwards around immured single bar 26A towards itself and adhere hook fastening material 20 of bundling strap first end portion 18A to loop fastening material 19 of bundling strap center portion 18C. Bundling strap center portion 18C is then wrapped around a section of coiled line type material 88 and around body 10H and adhere hook fastening material 20 of bundling strap second end portion 18B to loop fastening material 19 of bundling strap 16A.

FIGS. 6B and 6C shows a body 10I that is formed on an aft end of an electrical plug. Body 10I is formed with a line hole 102 disposed horizontally through body 10I. Line hole 102 is formed to receive segmented portion of line type material 86. Body 10I is formed with one immured single bar 26A disposed on a side of body 10I. Bundling strap 16C is shown here. Bundling strap 16C is comprising of a stitch 46.

Operationally body 10I is firmly disposed to segmented portion of line type material 86 by conventional methods that are used in attaching an electrical plug to an electrical cord. First fold bundling strap first end portion 18E backwards around immured single bar 26A towards itself and adhere first end portion 18E to bundling strap center portion 18C with stitch 46. Bundling strap center portion 18C is then wrapped around a section of coiled line type material 88 and around body 10I and adhere hook fastening material 20 of bundling strap second end portion 18B to loop fastening material 19 of bundling strap 16C.

Figure 7A:
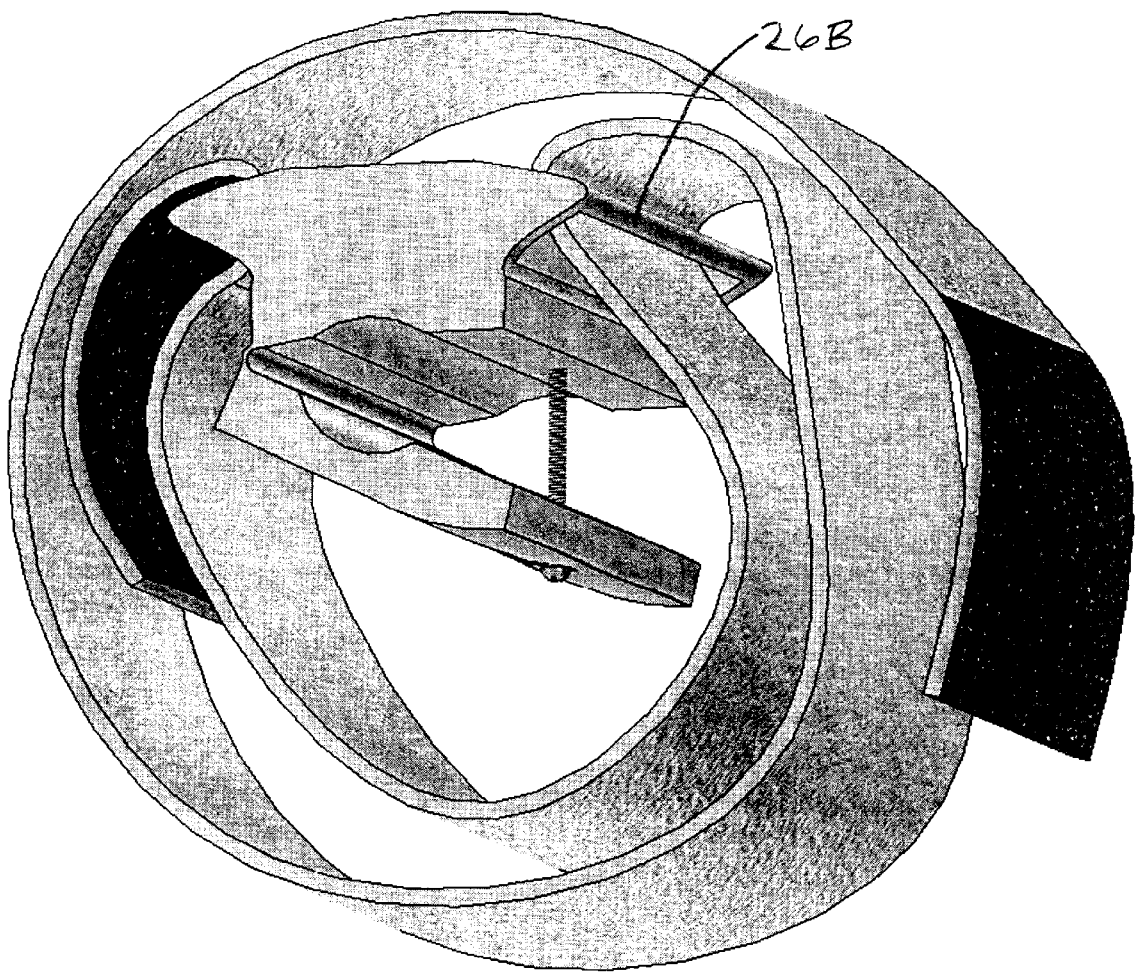
FIG. 7A is an alternate sided forward perspective view of the bundling device with a body 10J and a bundling strap 16A in a position five.

FIGS. 7 and 7A shows a body 10J that is formed with a plastic material by using a process called injector molding. Body 10J formed with a body portion one 11C and a body portion two 12C that are joined together at a bending point 13C. Bending point 13C is disposed on the side of body 10J. Body portion one 11C is formed with a horizontally disposed immured single bar 26A, and body portion two 12C is formed with a horizontally disposed immured single bar 26B. Body 10A is comprising of a screw 34C disposed vertically through body portion one 11C and body portion two 12C. Body portion one 11C is comprising of an elongated hole 30C. Elongated hole 30C is large enough to provide access for a screw body 38 and is small enough to limit entry of a screw head 39. Body portion two 12C is comprising of a threaded hole 32C. Where threaded hole 32C is disposed directly across from elongated hole 30C. Bundling strap 16A is shown here in position five.

Operationally, first body 10J is firmly disposed to segmented portion of line type material 86 by placing segmented portion of line type material 86 between body portion one 11C and a body portion two 12C. Then tighten screw 34C which will compress bending point 13C and shorten the width of body 10J and firmly dispose body 10J to segmented portion of line type material 86. First fold bundling strap first end portion 18A backwards around immured single bar 26A towards itself and adhere hook fastening material 20 of bundling strap first end portion 18A to loop fastening material 19 of bundling strap center portion 18C. Bundling strap center portion 18C is then wrapped around a section of coiled line type material 88. Fold bundling strap second end portion 18B backwards around immured single bar 26B towards itself and adhere hook fastening material 20 of bundling strap second end portion 18B to loop fastening material 19 of bundling strap 16A.

FIGS. 8 and 8A shows a body 10K that is formed with a plastic material by using a process called injector molding. Body 10K formed with a body portion one 11D and a body portion two 12D that are joined together at a bending point 13B. Bending point 13B is disposed at the top of body 10K. Body 10K is formed with a recessed area 42A designed to receive segmented portion of line type material 86. Recessed area 42A is disposed horizontally through body 10K from body front 80A to body front 80B. Body portion two 12D is formed with a horizontally disposed immured single bar 26B. A bundling strap 16B is shown here in a third position. Bundling strap first end portion 18D is disposed on top of body portion one 11D. A portion of glue 78 is disposed between body portion one 11D and bundling strap first end portion 18D. Body 10K is comprising of a thumb screw 35A and a thumb screw 35B disposed horizontally through body portion one 11D and body portion two 12D. Body portion one 11D is comprising of a screw hole 62A and a screw hole 62B. Screw holes 30A and 30B are large enough to provide access for a screw body 38 and are small enough limit entry of a screw head 39. Body portion two 12D is comprising of threaded hole 32A and threaded hole 32B. Where threaded holes 32A and 32B are disposed directly across from screw holes 62A and 62B respectively.

Operationally, first body 10K is firmly disposed to segmented portion of line type material 86 by placing segmented portion of line type material 86 between body portion one 11D and a body portion two 12D. Then tighten thumb screws 35A and 35B which will compress bending point 13B and shorten the width of body 10K and firmly dispose body 10K to segmented portion of line type material 86. Bundling strap first end portion 18D is disposed to body portion one 11D with glue 78. Bundling strap center portion 18C is then wrapped around a section of coiled line type material 88. Then fold bundling strap second end portion 18B backwards around immured single bar 26B towards itself and adhere hook fastening material 20 of bundling strap second end portion 18B to loop fastening material 19 of bundling strap 16B.

Figure 9:
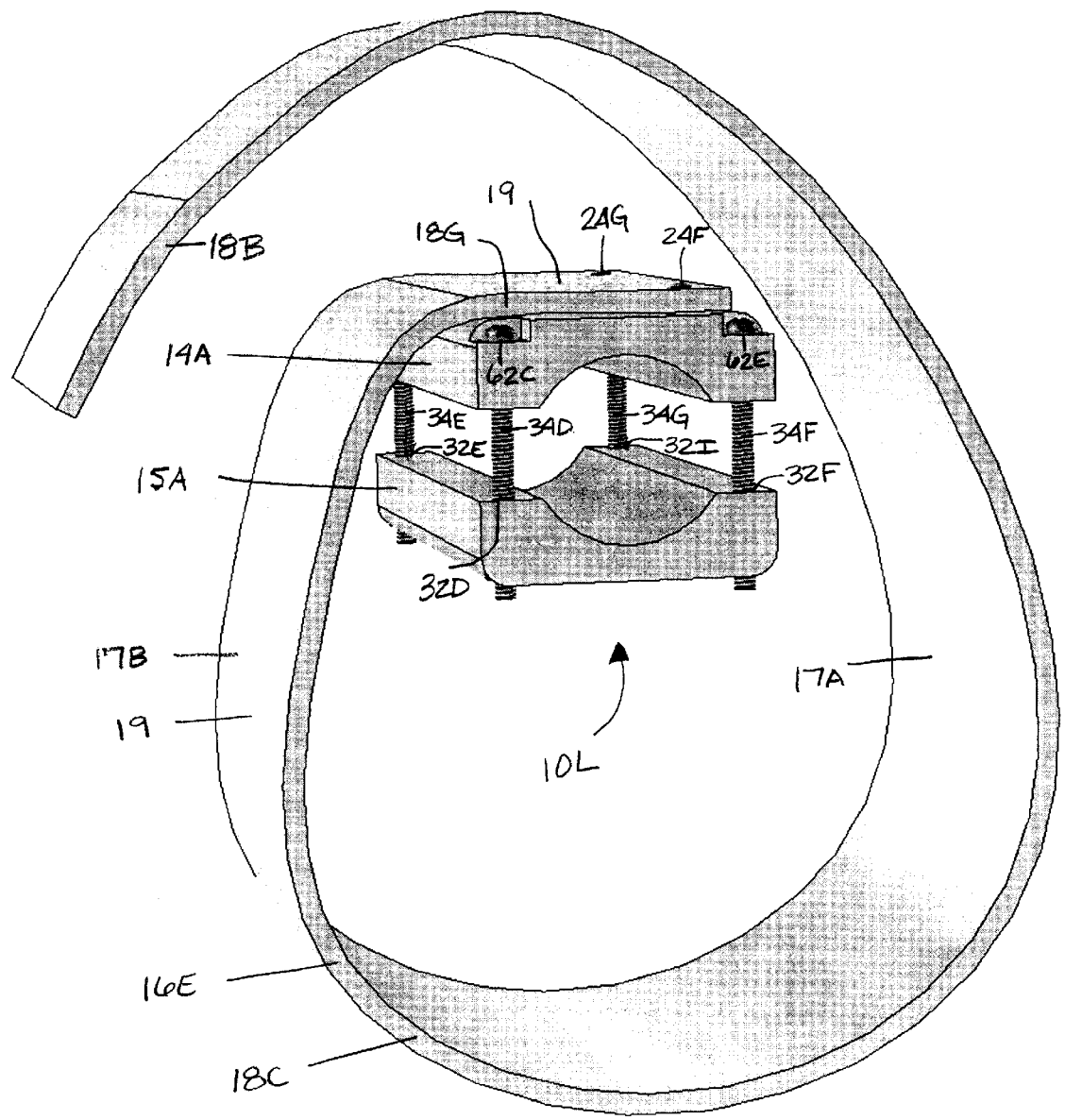
FIG. 9 is a forward perspective view of the bundling device with a body 10L and a bundling strap 16E.

FIGS. 9 and 9A shows a body 10L that is formed with a plastic material by using a process called injector molding. Body 10L formed with a body piece one 14A and a body piece two 15A. Body piece two 15A is positioned directly below from body piece one 14A. Body piece one 14A is comprising of a screw hole 64C, a screw hole 64D, a screw hole 64E and a screw hole 64F. Body piece two 15A is comprising of a threaded screw hole 32D, a threaded screw hole 32E, a threaded screw hole 32F and a threaded screw hole 32G disposed directly across from screw holes 62C, 62D, 62E and 62F respectfully. Body 10L is comprising of a screw 34D, a screw 34E, a screw 34F and a screw 34G disposed vertically through body pieces 14A and 15A. Bundling strap 16E is shown here. A bundling strap 16E, shown here in position one, is constructed with a combination of both two parts of VELCRO material that are permanently attached to each other by glue or stitching. Two opposite facing surfaces together form a bundling strap surface one 17A and a bundling strap surface two 17B. Bundling strap 16E is sectioned into three portions, a bundling strap first end portion 18G, a bundling strap second end portion 18B, and a bundling strap center portion 18C that are permanently assembled together by glue or stitching. Bundling strap first end portion 18G and bundling strap center portion 18C are comprising of loop fastening material 19 on bundling strap surface 17B. Bundling strap second end portion 18B is comprising of hook fastening material 20 on bundling strap surface 17A. Bundling strap first end portion 18G is disposed to body piece one 14A by a securing pin 24F and a securing pin 24G.

Operationally, first body 10L is firmly disposed to segmented portion of line type material 86 by placing segmented portion of line type material 86 between body piece one 14A and a body piece two 15A. Then tighten screws 34 D–G which will sandwich segmented portion of line type material 86 between body piece one 14A and a body piece two 15A and firmly dispose body 10L to segmented portion of line type material 86. Bundling strap first end portion 18G is disposed to body piece one 14A by securing pins 24F and 24G through bundling strap first end portion 18G and body 10L. Then bundling strap center portion 18C is wrapped around a section of coiled line type material 88 and around body 10L and adhere hook fastening material 20 of bundling strap second end portion 18B to loop fastening material 19 of bundling strap 16E.

FIGS. 9B and 9C shows a body 10M that is formed with a plastic material by using a process called injector molding. Body 10M formed with a body piece one 14B and a body piece two 15B. Body piece two 15B is positioned directly across from body piece one 14B. Body piece one 14B is formed with a horizontally disposed immured single bar 61A and a horizontally disposed immured single bar 61B. Horizontally disposed immured single bars 61A and 61B are disposed on top of body piece one 14B. An outside surface 83 of body piece one 14B is comprising of a row of teeth 72A and an outside surface 83 of body piece one 14B is comprising of a row of teeth 72A. An inside surface 87 of body piece two 15B is comprising of a row of teeth 72B and an inside surface 87 of body piece two 15B is comprising of a row of teeth 72B. Body piece one 14B is formed with a recessed area 42E designed to receive segmented portion of line type material 86. Recessed area 42C is disposed horizontally through body piece one 14B from body front 80A to body front 80B. Recessed area 42C is formed to receive a segmented portion of line type material. Body piece two 15B is formed with a recessed area 42D designed to receive a segmented portion of line type material 86. Recessed area 42D is disposed horizontally through body piece two 15B from body front 80A to body front 80B. A bundling strap 16A is shown here in position one.

Operationally, first body 10M is firmly disposed to segmented portion of line type material 86 by placing segmented portion of line type material 86 between body piece one 14B and a body piece two 15B. Then engage rows of teeth 72A of body piece one 14B with rows of teeth 72B of body piece two 15B. Squeeze together body piece one 14B and body piece two 15B so as to sandwich segmented portion of line type material 86, between body piece one 14B and body piece two 15B and firmly dispose body 10M to segmented portion of line type material 86.

FIGS. 9D and 9E shows a body 10N that is formed with a plastic material by using a process called injector molding.

Body 10N formed with a mounting bracket 21A and a mounting bracket 21B formed on top of body piece two 15C. A hanger strap 22A is comprised of a flexible nylon fabric material. A hanger strap end one 23A is mounted to mounting bracket 21A by a securing pin 24A and a hanger strap end two 23B is mounted to mounting bracket 21B by securing pin 24B. Body piece one 14C is formed with a horizontally disposed immured single bar 26A, and body piece two 15C is formed with a horizontally disposed immured single bar 26B. Body piece two 15C is positioned directly across from body piece one 14C. Body piece one 14C is comprising of a screw hole 64G, a screw hole 64H, a screw hole 64I and a screw hole 64J. Body piece two 15C is comprising of a threaded screw hole 32J, a threaded screw hole 32K, a threaded screw hole 32L and a threaded screw hole 32M disposed directly across from screw holes 64G, 64H, 64I and 64J respectfully. Body 10N is comprising of a screw 34H, a screw 34I, a screw 34J and a screw 34K disposed horizontally through body pieces 14C and 15C. A bundling strap 16A is shown here in position six.

Operationally, first body 10N is firmly disposed to segmented portion of line type material 86 by placing segmented portion of line type material 86 between body piece one 14C and a body piece two 15C. Then tighten screws 34 H–K which will sandwich segmented portion of line type material 86 between body piece one 14C and a body piece two 15C and firmly dispose body 10N to segmented portion of line type material 86. Fold bundling strap first end portion 18A backwards around immured single bar 26A towards itself and adhere hook fastening material 20 of bundling strap first end portion 18A to loop fastening material 19 of bundling strap center portion 18C. Bundling strap center portion 18C is then wrapped around a section of coiled line type material 88. Fold bundling strap second end portion 18B backwards around immured single bar 26B towards itself. Wrap bundling strap 16A back around a section of coiled line type material 88 then over body 10N and then insert bundling strap 16A under hanger strap 22A and adhere hook fastening material 20 of bundling strap second end portion 18B to loop fastening material 19 of bundling strap 16A.

FIGS. 9F and 9G shows a body 10O that is formed with a plastic material by using a process called injector molding. Body 10O formed with a mounting bracket 21A and a mounting bracket 21B formed on top of body piece two 15D. A hanger strap 22A is comprised of a flexible nylon fabric material. A hanger strap end one 23A is mounted to mounting bracket 21A by a securing pin 24A and a hanger strap end two 23B is mounted to mounting bracket 21B by securing pin 24B. Body piece one 14D is formed with a horizontally disposed immured single bar 26A, and body piece two 15D is formed with a horizontally disposed immured single bar 26B. Body piece one 14D is formed with a elongated convex engaging point 74 disposed at the top inside portion of body piece one 14D. Body piece two 15D is formed with a elongated concave engaging point 76 disposed at the top inside portion of body piece two 15D. Body piece one 14D is formed with arm 28A and body piece two 15D is formed with arm 28B. Arm 28A is disposed below body piece one 14D. Arm 28B is disposed below body piece two 15D. Arm 28A and 28B are formed so as to receive a segmented portion of line type material 86. Body piece two 15D is positioned directly across from body piece one 14D. Body 10O is comprising of a screw 34L and a screw 34M disposed horizontally through body piece one 14D and body piece two 15D. Body piece one 14D is comprising of an elongated hole 30A and an elongated hole 30B. Elongated holes 30A and 30B are large enough to provide access for a screw body 38 and are small enough to limit entry of a screw head 39. Body piece two 15D is comprising of a threaded hole 32N and a threaded hole 32O. Where threaded holes 32N and 32O are disposed directly across from elongated holes 30A and 30B respectively. A bundling strap 16A is shown here in position seven.

Operationally, first body 10O is firmly disposed to segmented portion of line type material 86 by placing segmented portion of line type material 86 between body piece one 14D and a body piece two 15D. Then tighten screws 34L and 34M which will sandwich segmented portion of line type material 86 between body piece one 14D and a body piece two 15D and firmly dispose body 10O to segmented portion of line type material 86. Fold bundling strap first end portion 18A backwards around immured single bar 26A towards itself. Then wrap bundling strap first end portion 18A around a section of coiled line type material 88 and adhere hook fastening material 20 of bundling strap first end portion 18A to loop fastening material 19 of bundling strap center portion 18C. Fold bundling strap second end portion 18B backwards around immured single bar 26B towards itself. Wrap bundling strap 16A back around a section of coiled line type material 88 and adhere hook fastening material 20 of bundling strap second end portion 18B to loop fastening material 19 of bundling strap 16A.

Conclusion, Ramification, and Scope

Accordingly, the reader will see that the bundling device of this invention may be used to both hold a personally sized coiled length of line type material, and may also be firmly disposed to a segmented portion of line type material. Bundling device may also be used again with another line type material without requiring a new bundling device. Furthermore, the bundling device has the additional advantages in that, Its reusable body permits the bundling device to be firmly disposed, removed, and firmly disposed again to a segmented portion of line type material, Its bundling strap permits the bundling device to hold various personally sized lengths of coiled line material, Its compact design provides the bundling device to be ideal for use in the field.

Although the description above contains many specificities, these should not be constructed as limiting the scope of the invention but as merely providing illustrations of some of the presently preferred embodiments of this invention. For example, the Body and strap may be of various colors. Bundling strap may be reinforced with a nylon type strap in between bundling strap surface one and bundling strap surface two. Instead of two formed immured single bars, two separate bars may be formed of a rigid material and immured by body. Arms may be of various shapes and sizes. Bars may be of various shapes and sizes. Recessed areas may be of various shapes and sizes. Hanger strap may be of various shapes and sizes. Where bending points are used other devices with equal results may be used like a hinge. Bending points may be of various shapes and sizes. A variety of plastic materials may be used as well as another rigid type material that doesn't fracture easily upon bending. Where securing pins are used other devices with equal results may be used. The bundling device handle may be designed as to second as a hanging device for the bundling device. Handle may be of various shapes and sizes. Where glue is used another bonding material may be used. Thus the scope of the invention should be determined by the appended claims and their legal equivalents, rather than by the examples given.

I claim:

1. A line bundling device adapted to be separately disposed firmly to a segmented portion of line type material and holds a personally sized coiled length of line type material so as to permit the length of coiled line type material to be unbundled from the device and the segmented portion to stay firmly disposed to the device, comprising a reusable separate body formed of a plastic type material with at least a first piece of a predetermined size in a predetermined shape comprising all or part of a holding means whereby said body is firmly disposed to said segmented portion of line type material, where said body comprises a flexible bundling strap for looping about and bundling said personally sized coiled length of line type material therewithin, and said body is comprising all or part of a fastening means in which to dispose a first end portion of said flexible strap to said body, where said strap comprising a surface one and a surface two, a first end portion, a second end portion, and a center portion, where said strap is disposed to said body at a perpendicular position to said line, and where at least said surface one of said second end portion of said strap is comprised of a hook fastening material, and where at least said surface two of said center portion of said strap is comprised of a loop fastening material, where said body is formed in a predetermined shape so said first end portion of said strap is disposed to said body at a predetermined position where as that said hook fastening material of said second end portion of said strap may traverse a predetermined portion of said body so as to effectively relate with and join to said loop fastening material of said strap.

2. A line bundling device according to claim 1 where said surface two of said first end portion of said strap is comprised of said loop fastening material.

3. A line bundling device according to claim 1 where said bundling device is comprising of a device placed in a predetermined portion so that said bundling device may be hung for storage.

4. A line bundling device according to claim 1 where an electrical plug body is formed into said body of said bundling device.

5. A line bundling device according to claim 1 where a harnessing means is disposed to said body with a predetermined size and in a predetermined position so that said second end portion of said strap and said center portion of said strap may traverse a predetermined portion of said harnessing means so as to be able to fold at least said second end portion of said strap back towards its self and retain a relative portion of said strap to said body so that said hook fastening material of said surface two of said second end of said strap may effectively relate with and join to at least said surface two of said loop fastening material of said strap.

6. A line bundling device adapted to be separately disposed firmly to a segmented portion of line type material and holds a personally sized coiled length of line type material so as to permit the length of coiled line type material to be unbundled from the device and the segmented portion to stay firmly disposed to the device, comprising a reusable separate body formed of a plastic type material with at least a first piece of a predetermined size in a predetermined shape comprising all or part of a holding means whereby said body is firmly disposed to said segmented portion of line type material, and where said bundling device comprises a flexible strap for looping about and bundling said personally sized coiled length of line type material therewithin, and where a harnessing means is disposed to said bundling device with a predetermined size and in a predetermined position so that a first end portion of said strap and a center portion of said strap may traverse a predetermined portion of said harnessing means so as to be able to fold at least said first end portion of said strap towards its self and to retain a relative portion of said strap to said body, and where said first end portion of said strap is comprised of all or part of a fastening means so said first end portion of said strap may be joined to a relative portion of said strap, where said strap comprising a surface one and a surface two, a first end portion, a second end portion, and a center portion, where said strap is disposed to said body at a perpendicular position to said line, and where at least said surface one of said second end portion of said strap is comprised of a hook fastening material, and where at least said surface two of said center portion of said strap is comprised of a loop fastening material, where said body is constructed in a predetermined shape so said first end portion of said strap relates to said body in a predetermined position where as that said hook fastening material of said surface one of said second said end portion of said strap may traverse a predetermined portion of said body so as to effectively relate with and join to said loop fastening material of said strap.

7. A line bundling device according to claim 6 where an electrical plug body is formed into said body of said bundling device.

8. A line bundling device according to claim 6 where said harnessing means is disposed to said body with a predetermined size and in a predetermined position so that said second end portion of said strap and said center portion of said strap may traverse a predetermined portion of said harnessing means so as to be able to fold at least said second end portion of said strap back towards its self and retain a relative portion of said strap to said body so that said hook fastening material of said surface two of said second end of said strap may effectively relate with and join to at least said surface two of said loop fastening material of said strap.

9. A line bundling device according to claim 6 where said surface one of said first end portion of said strap is comprised of said loop fastening material.

10. A line bundling device according to claim 6 where said bundling device is comprising of a device placed in a predetermined position so that said bundling device may be hung for storage.

* * * * *